US012640633B2

(12) United States Patent
Das et al.

(10) Patent No.: US 12,640,633 B2
(45) Date of Patent: May 26, 2026

(54) TRANSVERSE FLUX MACHINE WITH SEGMENTED ROTOR

(71) Applicant: Steering Solutions IP Holding Corporation, Saginaw, MI (US)

(72) Inventors: Shuvajit Das, Sterling Heights, MI (US); Alejandro Pina Ortega, Grand Blanc, MI (US); Anik Chowdhury, Auburn Hills, MI (US); Rong Yang, Troy, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 310 days.

(21) Appl. No.: 18/480,982

(22) Filed: Oct. 4, 2023

(65) Prior Publication Data

US 2025/0119042 A1 Apr. 10, 2025

(51) Int. Cl.
*H02K 21/14* (2006.01)
*B62D 5/00* (2006.01)

(52) U.S. Cl.
CPC ........... *H02K 21/145* (2013.01); *B62D 5/006* (2013.01); *H02K 2201/12* (2013.01)

(58) Field of Classification Search
CPC ............. H02K 21/145; H02K 2201/12; H02K 1/2791; H02K 2213/03; B62D 5/006
See application file for complete search history.

(56) References Cited

U.S. PATENT DOCUMENTS

| | | | |
|---|---|---|---|
| 4,103,195 A * | 7/1978 | Torossian ............. | H02K 15/021 310/216.065 |
| 10,340,779 B2 * | 7/2019 | Head ...................... | H02K 16/00 |
| 12,395,055 B2 * | 8/2025 | Wu ........................... | H02K 1/02 |
| 2002/0189888 A1 * | 12/2002 | Magnus ................. | B62D 5/006 180/443 |
| 2006/0091755 A1 * | 5/2006 | Carlisle ................ | H02K 21/125 310/168 |
| 2024/0001986 A1 | 1/2024 | Das | |

FOREIGN PATENT DOCUMENTS

EP 2317633 A2 * 5/2011 ........... H02K 1/2791

OTHER PUBLICATIONS

Webpage titled "Magnet Grades"; https://www.kjmagnetics.com/blog.asp?p=magnet-grade, last visited and PDF copy saved Aug. 31, 2023.

* cited by examiner

*Primary Examiner* — Tulsidas C Patel
*Assistant Examiner* — Mohammed Ahmed Qureshi
(74) *Attorney, Agent, or Firm* — Dickinson Wright PLLC

(57) ABSTRACT

A transverse flux machine (TFM) includes a rotor assembly configured to rotate about an axis and including a plurality of segments stacked axially. Each segment of the plurality of segments includes a plurality of rotor cores and a plurality of permanent magnets. The TFM also includes a stator assembly including a transverse flux core configured to direct a magnetic flux in each of an axial direction and a radial direction toward the rotor assembly. A steer-by-wire system for a vehicle includes a handwheel actuator coupled to apply a torque to a steering wheel. The handwheel actuator includes a transverse flux machine (TFM) which includes a stator assembly and a rotor assembly configured to rotate about an axis. The rotor assembly includes a plurality of segments stacked axially. Each segment of the plurality of segments includes a plurality of rotor cores and a plurality of permanent magnets.

20 Claims, 16 Drawing Sheets

Legend:
Windings
Steel
Aluminum
Bearings
Magnets
Shaft
Magnetic Flux
Electric Current

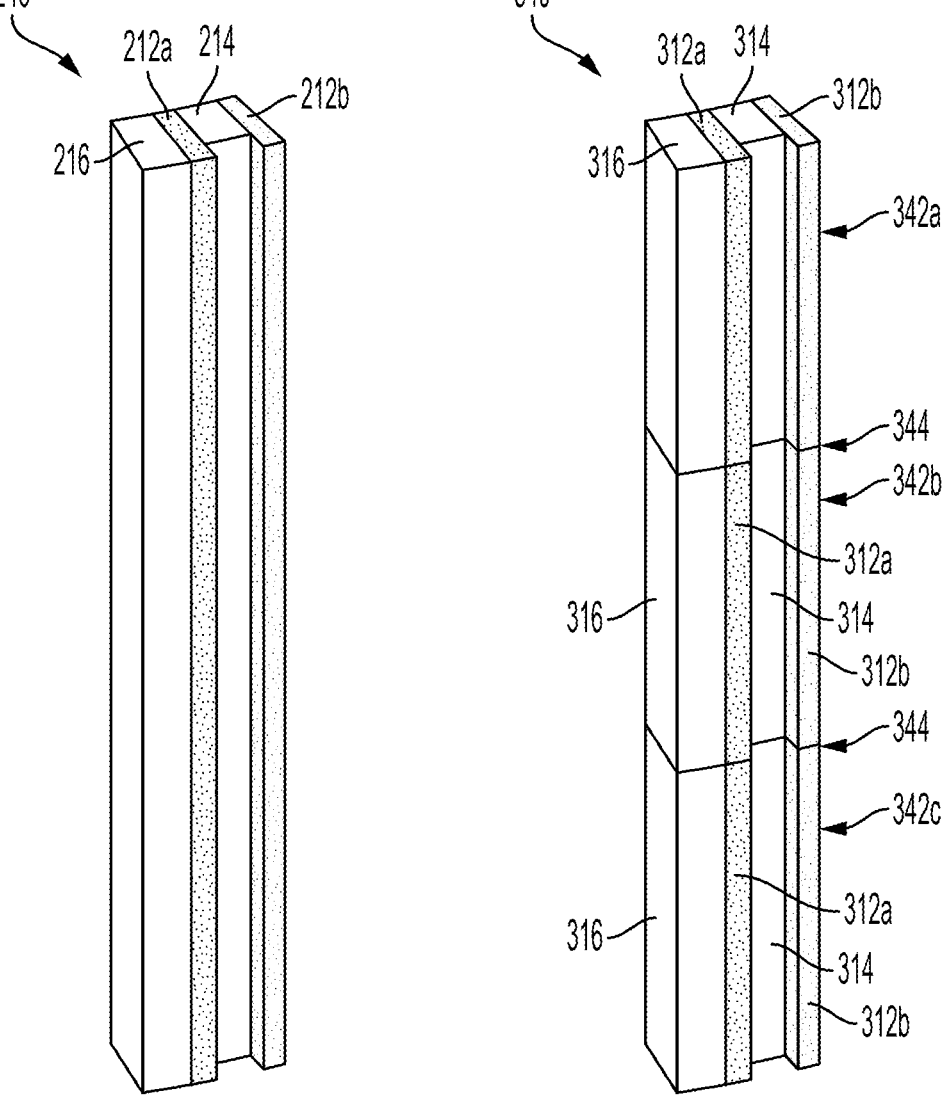
FIG. 16                    FIG. 17

CASE 1

CASE 2

CASE 3

TRANSVERSE FLUX MACHINE WITH SEGMENTED ROTOR

TECHNICAL FIELD

This disclosure relates to transverse flux electric machines and applications of such transverse flux electric machines in a handwheel actuator of a steering system for a vehicle.

BACKGROUND

A vehicle, such as a car, truck, sport utility vehicle, crossover, mini-van, marine craft, aircraft, all-terrain vehicle, recreational vehicle, or other suitable forms of transportation, typically includes a steering system, such as an electronic power steering (EPS) system, a steer-by-wire (SbW) steering system, a hydraulic steering system, or other suitable steering system. The steering system of such a vehicle typically controls various aspects of vehicle steering including providing steering assist to an operator of the vehicle, controlling steerable wheels of the vehicle, and the like.

Steer by wire (SbW) is a direct evolution of the electric power steering (EPS) system where there is no mechanical coupling between the handwheel and the steering rack. An EPS system may include a single actuator with the sole purpose of providing assist to the driver during steering actions. However, on the SbW system, there may be two electric actuators/motors with different functionalities. The electric actuator attached to the rack in a SbW system is called the roadwheel actuator (RWA), whereas the actuator on the driver side is known as the handwheel actuator (HWA). The RWA has the same assist providing function as an EPS system actuator. The HWA on the other hand acts more as a feedback motor rather than providing assist to the driver. In the absence of the HWA the handwheel on a SbW system would just freewheel because of the absence of any mechanical coupling/friction. The HWA, because of its' functionality opens a wide array of design related opportunities.

Based on their functionality, the torque speed curves of the different actuators used in steering systems may also be different. The very different operating domains of the EPS/RWA and the HWA motivates design exploration for HWA technology.

SUMMARY

This disclosure relates generally to transverse flux electric machines.

An aspect of the disclosed embodiments includes a transverse flux machine (TFM). The TFM includes: a rotor assembly configured to rotate about an axis and including a plurality of segments stacked axially, each segment of the plurality of segments includes a plurality of rotor cores and a plurality of permanent magnets; and a stator assembly including a transverse flux core configured to direct a magnetic flux in each of an axial direction and a radial direction toward the rotor assembly.

An aspect of the disclosed embodiments includes a steer-by-wire system for a vehicle. The steer-by-wire system includes a handwheel actuator coupled to apply a torque to a steering wheel. The handwheel actuator includes a transverse flux machine (TFM). The TFM includes: a rotor assembly configured to rotate about an axis and including a plurality of segments stacked axially, each segment of the plurality of segments includes a plurality of rotor cores and a plurality of permanent magnets; and a stator assembly including a transverse flux core configured to direct a magnetic flux in each of an axial direction and a radial direction toward the rotor assembly.

These and other aspects of the present disclosure are disclosed in the following detailed description of the embodiments, the appended claims, and the accompanying figures

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

FIG. 16 shows a perspective view of a section of the rotor assembly of FIG. 15A.

FIG. 17 shows a perspective view of a section of a rotor assembly, including a plurality of segments stacked axially.

DETAILED DESCRIPTION

The following discussion is directed to various embodiments of the disclosure. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

As described, a vehicle, such as a car, truck, sport utility vehicle, crossover, mini-van, marine craft, aircraft, all-terrain vehicle, recreational vehicle, or other suitable forms of transportation, typically includes a steering system, such as an EPS system, an SbW steering system, a hydraulic steering system, or other suitable steering system. The steering system of such a vehicle typically controls various aspects of vehicle steering including providing steering assist to an operator of the vehicle, controlling steerable wheels of the vehicle, and the like.

Figure 1:
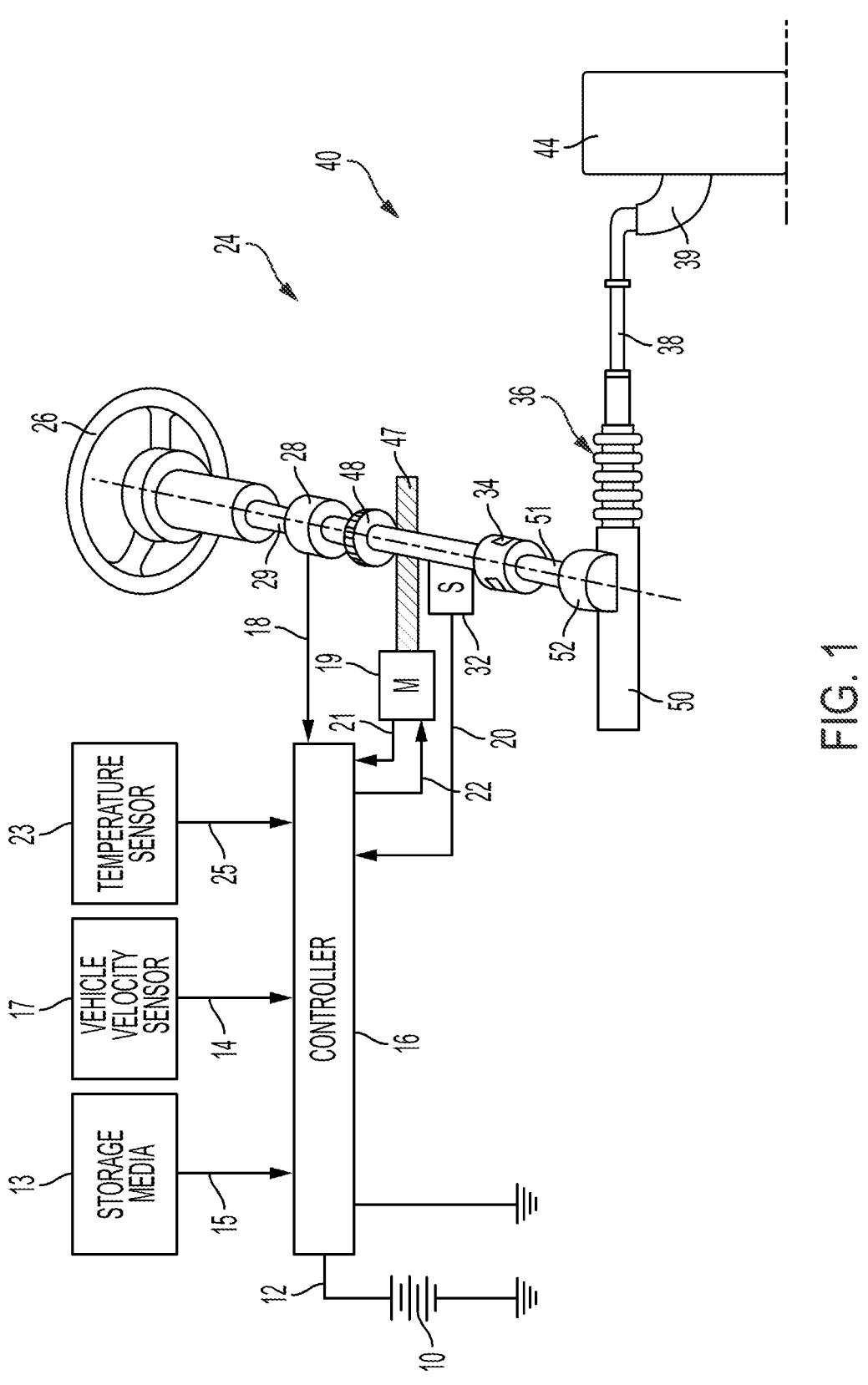
FIG. 1 is a schematic diagram of an electric power steering (EPS) system according to the principles of the present disclosure.

FIG. 1 is a schematic diagram of an electric power steering system (EPS) 40 suitable for implementation of the disclosed techniques. The EPS includes a steering mechanism 36, which includes a rack-and-pinion type mechanism having a toothed rack (not shown) within housing 50 and a pinion gear (also not shown) located under gear housing 52. As the operator input, hereinafter denoted as a steering wheel 26 (e.g. a handwheel and the like), is turned, the upper steering shaft 29 turns and the lower steering shaft 51, connected to the upper steering shaft 29 through universal joint 34, turns the pinion gear. Rotation of the pinion gear moves the rack, which moves tie rods 38 (only one shown) in turn moving the steering knuckles 39 (only one shown), which turn a steerable wheel(s) 44 (only one shown).

Electric power steering assist is provided through the steering motion control system generally designated by reference numeral 24 and includes the controller 16 and an electric machine, which could be a permanent magnet synchronous motor, and is hereinafter denoted as motor 19. The controller 16 is powered by the vehicle power supply 10 through supply conductors 12. The controller 16 receives a vehicle speed signal 14 representative of the vehicle velocity from a vehicle velocity sensor 17. Steering angle is measured through position sensor 32, which may be an optical encoding type sensor, variable resistance type sensor, or any other suitable type of position sensor, and supplies to the controller 16 a position signal 20. Motor velocity may be measured with a tachometer, or any other device, and transmitted to controller 16 as a velocity signal 21. A motor velocity denoted $\omega_m$ may be measured, calculated or a combination thereof. For example, the motor velocity $\omega_m$ may be calculated as the change of the motor position as measured by a position sensor 32 over a prescribed time interval. For example, motor speed $\omega_m$ may be determined as the derivative of the motor position $\theta_m$ with respect to time. It will be appreciated that there are numerous well-known methodologies for performing the function of a derivative.

As the steering wheel 26 is turned, torque sensor 28 senses the torque applied to the steering wheel 26 by the vehicle operator. The torque sensor 28 may include a torsion bar (not shown) and a variable resistive-type sensor (also not shown), which outputs a torque signal 18 to controller 16 in relation to the amount of twist on the torsion bar. Although this is one type of torque sensor, any other suitable torque-sensing device used with known signal processing techniques will suffice. In response to the various inputs, the controller sends a command 22 to the motor 19, which supplies torque assist to the steering system through worm 47 and worm gear 48, providing torque assist to the vehicle steering.

It should be noted that although the disclosed embodiments are described by way of reference to motor control for electric steering applications, it will be appreciated that such references are illustrative only and the disclosed embodiments may be applied to any motor control application employing an electric motor, e.g., steering, valve control, and the like. Moreover, the references and descriptions herein may apply to many forms of parameter sensors, including, but not limited to torque, position, speed and the like. It should also be noted that reference herein to electric machines including, but not limited to, motors, hereafter, for brevity and simplicity, reference will be made to motors only without limitation.

In the steering motion control system 24 as depicted, the controller 16 utilizes the torque, position, and speed, and like, to compute a command(s) to deliver the required output power. Controller 16 is disposed in communication with the various systems and sensors of the motor control system. Controller 16 receives signals from each of the system sensors, quantifies the received information, and provides an output command signal(s) in response thereto, in this instance, for example, to the motor 19. Controller 16 is configured to develop the corresponding voltage(s) out of inverter (not shown), which may optionally be incorporated with controller 16 and will be referred to herein as controller 16, such that, when applied to the motor 19, the desired torque or position is generated. In one or more examples, the controller 16 operates in a feedback control mode, as a current regulator, to generate the command 22. Alternatively, in one or more examples, the controller 16 operates in a feedforward control mode to generate the command 22. Because these voltages are related to the position and speed of the motor 19 and the desired torque, the position and/or speed of the rotor and the torque applied by an operator are determined. A position encoder is connected to the steering shaft 51 to detect the angular position $\theta$. The encoder may sense the rotary position based on optical detection, magnetic field variations, or other methodologies. Typical position sensors include potentiometers, resolvers, synchros, encoders, and the like, as well as combinations comprising at least one of the forgoing. The position encoder outputs a position signal 20 indicating the angular position of the steering shaft 51 and thereby, that of the motor 19.

Desired torque may be determined by one or more torque sensors 28, which transmit the torque signals 18 indicative of an applied torque. Such a torque sensor 28 and the torque signals 18 therefrom, as may be responsive to a compliant torsion bar, spring, or similar apparatus (not shown) configured to provide a response indicative of the torque applied.

In one or more examples, a temperature sensor 23 is located at the motor 19. Preferably, the temperature sensor 23 is configured to directly measure the temperature of the sensing portion of the motor 19. The temperature sensor 23 transmits a temperature signal 25 to the controller 16 to facilitate the processing prescribed herein and compensation. Typical temperature sensors include thermocouples, thermistors, thermostats, and the like, as well as combinations comprising at least one of the foregoing sensors, which when appropriately placed provide a calibratable signal proportional to the particular temperature.

The position signal 20, velocity signal 21, and torque signals 18 among others, are applied to the controller 16. The controller 16 processes all input signals to generate values corresponding to each of the signals resulting in a rotor position value, a motor speed value, and a torque value being available for the processing in the algorithms as prescribed herein. Measurement signals, such as the above mentioned are also commonly linearized, compensated, and filtered as desired to enhance the characteristics or eliminate undesirable characteristics of the acquired signal. For example, the signals may be linearized to improve processing speed, or to address a large dynamic range of the signal. In addition, frequency or time based compensation and filtering may be employed to eliminate noise or avoid undesirable spectral characteristics.

In order to perform the prescribed functions and desired processing, as well as the computations therefore (e.g., the identification of motor parameters, control algorithm(s), and the like), controller 16 may include, but not be limited to, a processor(s), computer(s), DSP(s), memory, storage, register(s), timing, interrupt(s), communication interface(s), and input/output signal interfaces, and the like, as well as combinations comprising at least one of the foregoing. For example, controller 16 may include input signal processing and filtering to enable accurate sampling and conversion or acquisitions of such signals from communications interfaces.

Figure 2:
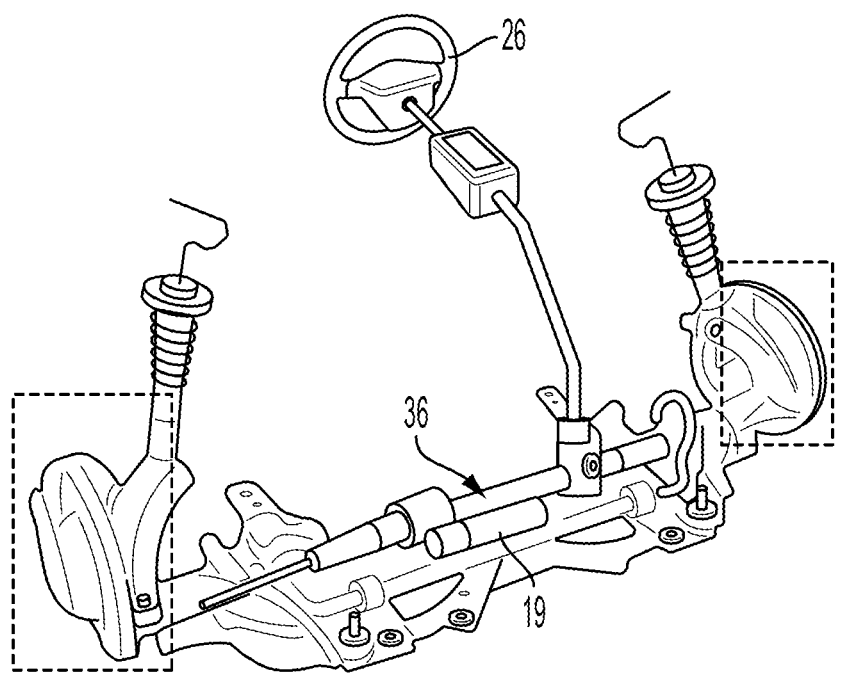
FIG. 2 generally illustrates an electric power steering (EPS) system according to the principles of the present disclosure.
Figure 3:
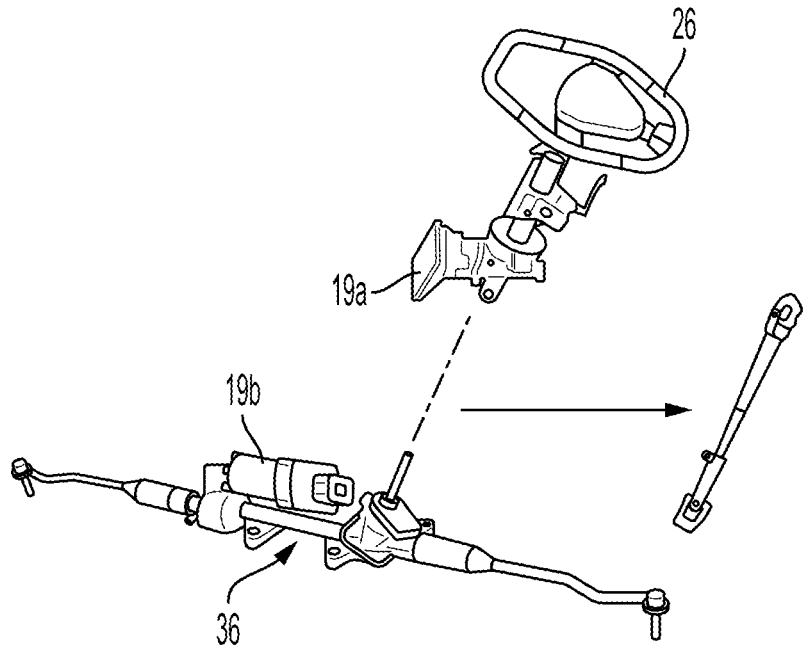
FIG. 3 generally illustrates a steer-by-wire (SbW) steering system according to the principles of the present disclosure.

FIG. 2 generally illustrates an electric power steering (EPS) system, and FIG. 3 generally illustrates a steer-by-wire (SbW) steering system. The EPS system of FIG. 2 may be similar or identical to the EPS system 40 of FIG. 1, except with the motor 19 mounted directly to the steering mechanism 36. The SbW system of FIG. 4B may be similar or identical to the EPS system 40 of FIG. 1, except without any physical linkage between the steering wheel 26 and the steerable wheels 44, and with two separate and independent motors 19a, 19b. As shown, the SbW system includes a first motor 19a, also called a handwheel actuator (HWA), configured to provide a torque to the steering wheel 26 for providing haptic feedback to a driver.

Figure 4:
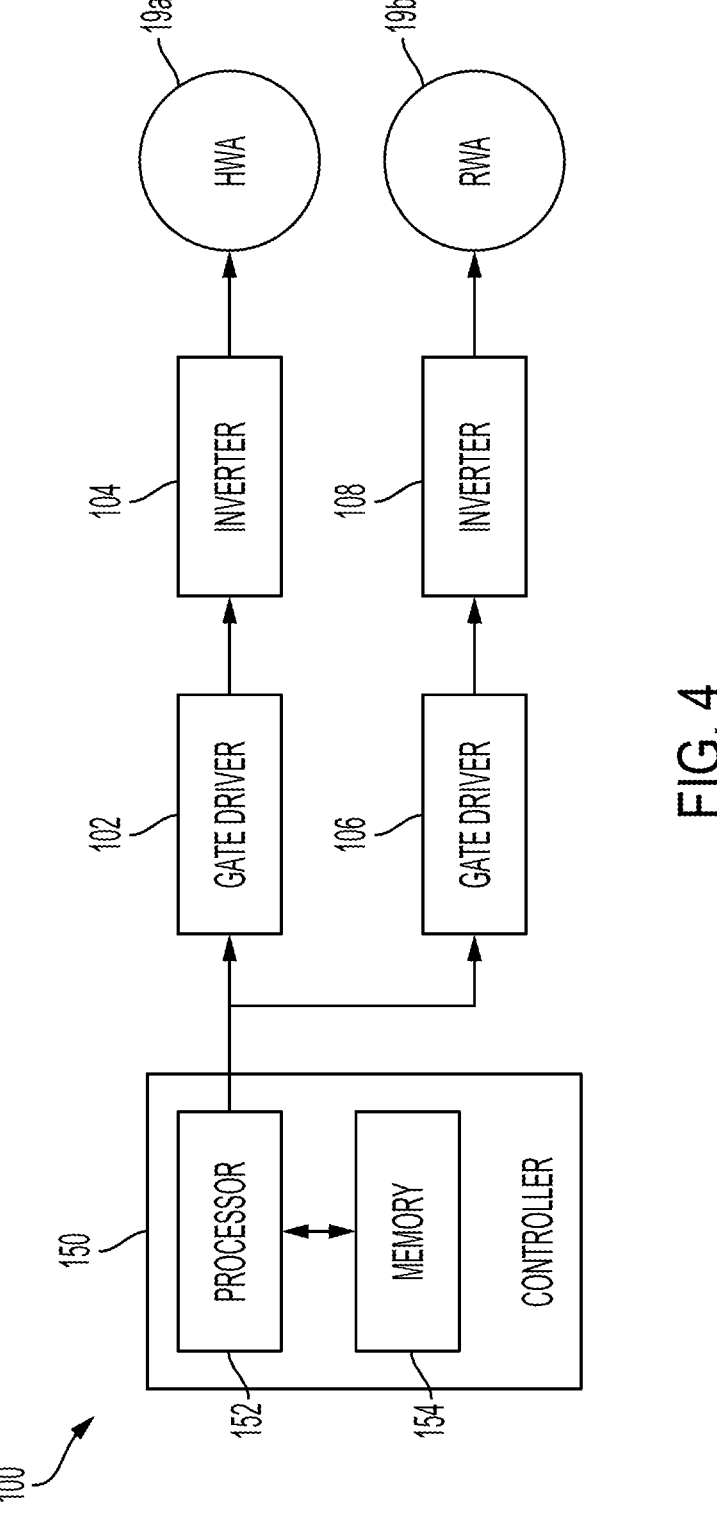
FIG. 4 is a schematic diagram of a motor drive system according to the principles of the present disclosure.

Steer by wire (SbW) is a direct evolution of the electric power steering (EPS) system where there is no mechanical coupling between the steering wheel 26 and the steering rack. As seen in FIG. 4A, an EPS system may include a single actuator 19 with the sole purpose of providing assist to the driver during steering actions. However, on the SbW system, there are two electric actuators/motors with different functionalities. The electric actuator attached to the steering mechanism 36 in a SbW system is called the roadwheel actuator (RWA) 19b, whereas the actuator on the driver side is known as the handwheel actuator (HWA) 19b. The RWA 19b may provide the same assist function as the actuator 19 in an EPS system. The HWA 19a, on the other hand, acts more as a feedback motor rather than providing assist to the driver. In the absence of the HWA 19a, the handwheel on a SbW system would just freewheel because of the absence of any mechanical coupling/friction.

In some embodiments, the steering system may include a controller, such as controller 100, as is generally illustrated in FIG. 3. The controller 100 may include any suitable controller. The controller 100 may be configured to control, for example, the various functions of the vehicle systems described herein. The controller 100 may include a processor 102 and a memory 104. The processor 102 may include any suitable processor, such as those described herein. Additionally, or alternatively, the controller 100 may include any suitable number of processors, in addition to or other than the processor 102. The memory 104 may comprise a single disk or a plurality of disks (e.g., hard drives), and includes a storage management module that manages one or more partitions within the memory 104. In some embodiments, memory 104 may include flash memory, semiconductor (solid state) memory or the like. The memory 104 may include Random Access Memory (RAM), a Read-Only Memory (ROM), or a combination thereof. The memory 104 may include instructions that, when executed by the processor 102, cause the processor 102 to, at least, control various functions of the steering system and/or any other suitable function, including those of the systems and methods described herein.

The controller 100 may receive one or more signals from various measurement devices or sensors 106 indicating sensed or measured characteristics of the vehicle. The sensors 106 may include any suitable sensors, measurement devices, and/or other suitable mechanisms. For example, the sensors 106 may include one or more torque sensors or devices, one or more handwheel position sensors or devices, one or more motor position sensor or devices, one or more motor angle sensors or devices, other suitable sensors or devices, or a combination thereof. The one or more signals may indicate a handwheel torque, a handwheel angle, a motor angle or motor positon, a vehicle speed, other suitable information, or a combination thereof.

Figure 5:
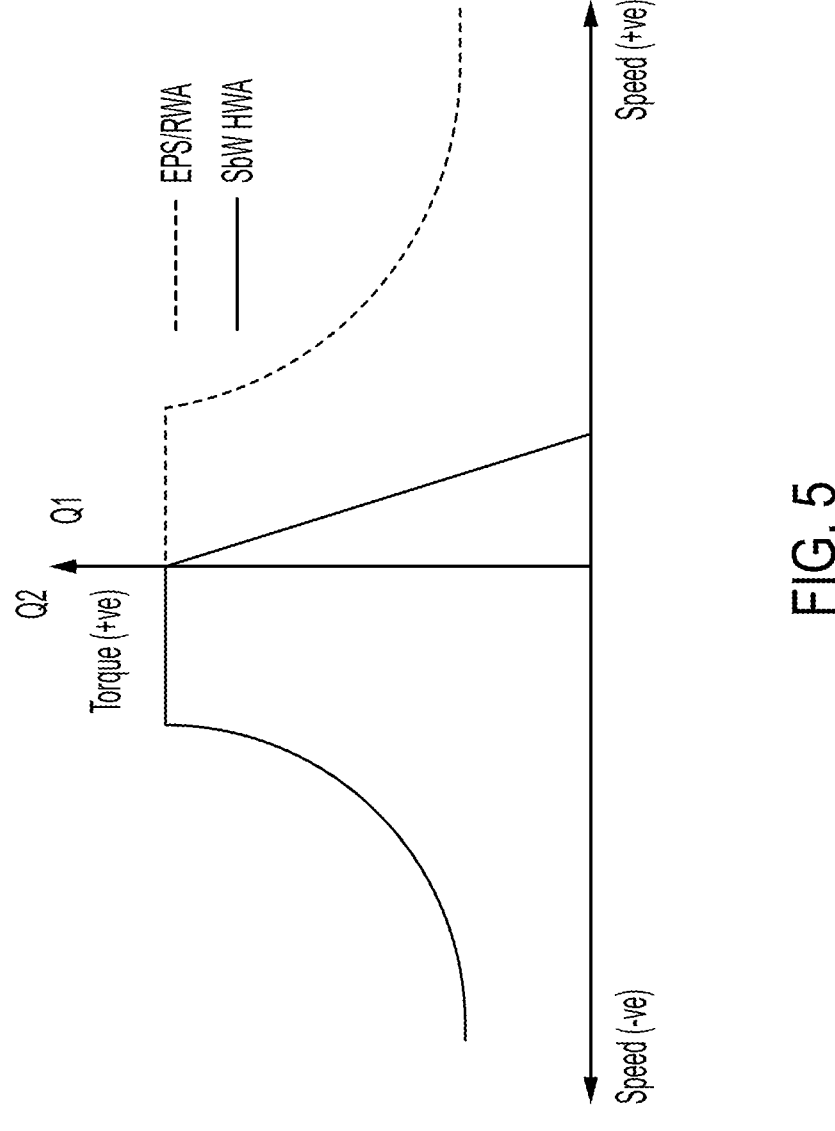
FIG. 5 shows a graph illustrating torque-speed curves of steering system actuators according to the principles of the present disclosure.

FIG. 5 shows a graph illustrating torque-speed curves of steering system actuators 19, 19a, and 19b. Based on their functionality, the different steering system actuators 19, 19a, 19b have different speed curves. As indicated by the dashed line in FIG. 5, the EPS actuator 19 and the RWA 19b in a SbW each work in the first quadrant (Q1) of the torque-speed curve. The positive direction of speed in Q1 suggests that the actuator acts in the same direction as the driver's handwheel motion and provides assist. However, as indicated by the solid line, the HWA 19a of the SbW system operates mostly in the second quadrant (Q2) of the torque-speed curve. The HWA 19a moves opposite (speed −ve) to the driver's handwheel motion and provides feedback to the driver. This feedback may be necessary to provide generic steering feel and road condition feedback to the driver. Additionally, some low-speed assist (Q1 operation) might also be required from the HWA 19a, as seen in FIG. 5.

The HWA 19a may include an electric motor coupled apply torque to the steering wheel 26 configurations, such as a Worm gear drive, Belt drive, and/or a Direct drive. For the worm gear and belt driven cases, low torque (~3 Nm) and high speed (~3000 rpm) PMSMs can be used as the actuator. Both surface mounted PMSM (SPMSM) and interior PMSM (IPMSM) topologies can be used for such HWA architectures. Moreover, because of their similarity (in terms of torque speed ranges) a significant number of components can be transferred directly from column EPS (CEPS) systems to worm gear or belt driven SbW handwheel systems. For the direct drive case, high torque (~30 Nm for egress/ingress) and low speed (~200-300 rpm) actuators are required. The number of mechanical components decrease for the direct drive architecture, which in turn has the potential to reduce cost and weight. Moreover, a reduction in weight is directly linked to range efficiency or mileage (miles/gallon) increment. However, traditional PMSMs need to be redesigned for the high torque and low speed output requirement of the direct drive architecture.

Based on their functionality, the torque speed curves of the different actuators used in steering systems also changes. As shown in FIG. 5, the EPS actuator and the RWA in a SbW system, each work in the first quadrant (Q1) of the torque-speed curve. The positive direction of speed in Q1 suggests that the actuator acts in the same direction as the driver's handwheel motion and provides assist. However, the SbW HWA operates mostly in the second quadrant (Q2) of the torque speed curve. The HWA moves opposite (speed-ve) to the driver's handwheel motion and provides feedback to the driver. This feedback is necessary to provide generic steering feel and road condition feedback to the driver. Moreover, some low-speed assist (Q1 operation) might also be required from the HWA, as seen in FIG. 5. The very different operating domains of the EPS/RWA and the HWA motivates design exploration for HWA technology.

The HWA may include an electric motor coupled apply torque to the steering wheel 26 configurations, such as a Worm gear drive, Belt drive, and/or a Direct drive. For the worm gear and belt driven cases, low torque (~3 Nm) and high speed (~3000 rpm) PMSMs can be used as the actuator. Both surface mounted PMSM (SPMSM) and interior PMSM (IPMSM) topologies can be used for such HWA architectures. Moreover, because of their similarity (in terms of torque speed ranges) a significant number of components can be transferred directly from column EPS (CEPS) systems to worm gear or belt driven SbW handwheel systems. For the direct drive case, high torque (~30 Nm for egress/ingress) and low speed (~200-300 rpm) actuators are required. The number of mechanical components decrease for the direct drive architecture, which in turn has the potential to reduce cost and weight. Moreover, a reduction in weight is directly linked to range efficiency or mileage (miles/gallon) increment. However, traditional PMSMs need to be redesigned for the high torque and low speed output requirement of the direct drive architecture.

Figure 6:
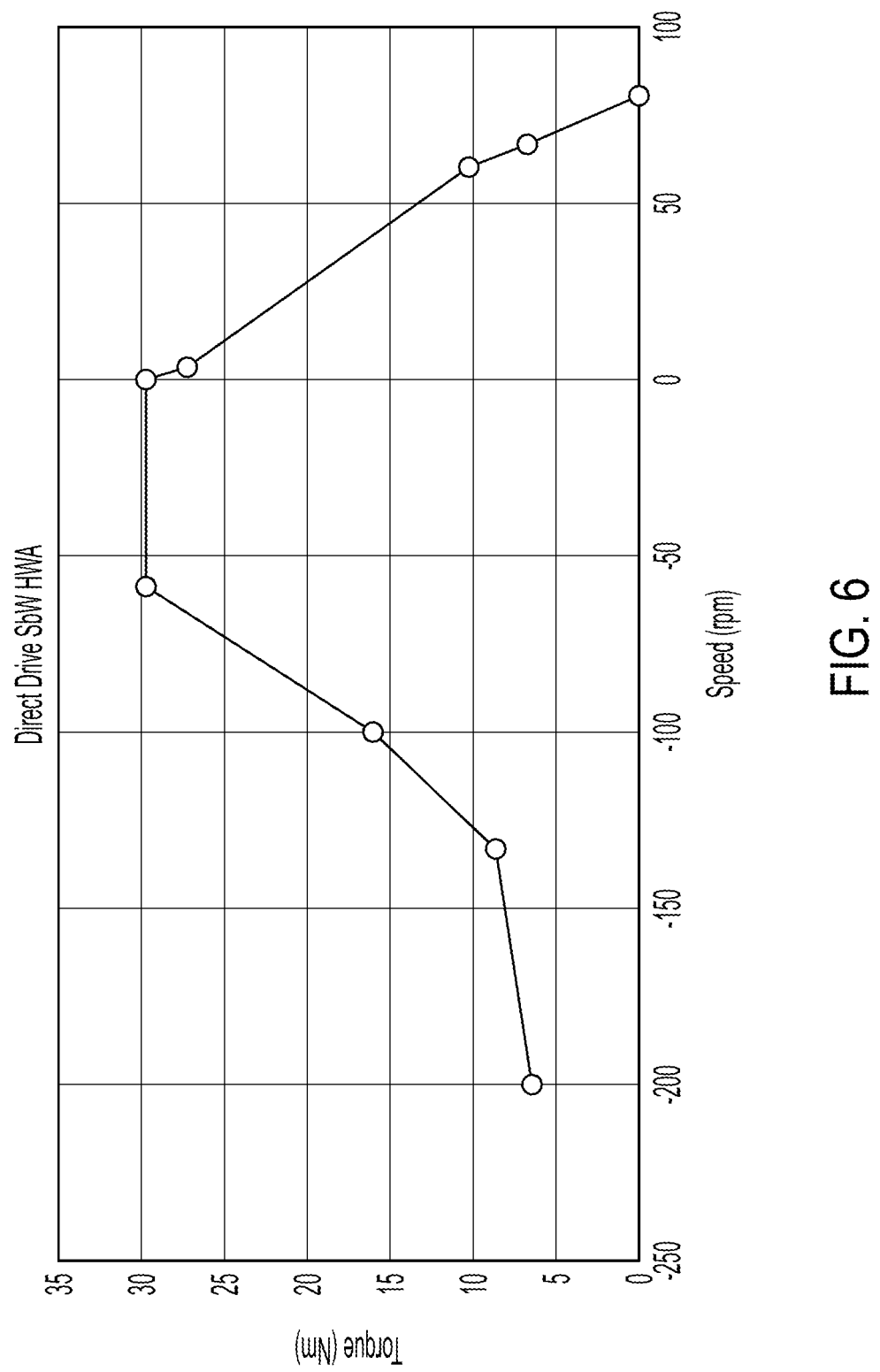
FIG. 6 shows a graph illustrating a torque-speed curve of a direct drive handwheel actuator in a SbW steering system.

FIG. 6 shows a graph illustrating torque-speed curves of the HWA 19a in a SbW steering system, with a direct drive configuration (1:1 gear ratio). As shown, the HWA 19a generally operates with a speed of between −200 and +80 revolutions per minute (RPM), and produces a torque of between 0 and about 30 Newton meters (Nm). Transverse flux machines have the potential to perform in this low-speed high torque direct drive application.

Figures 7, 8, 9:
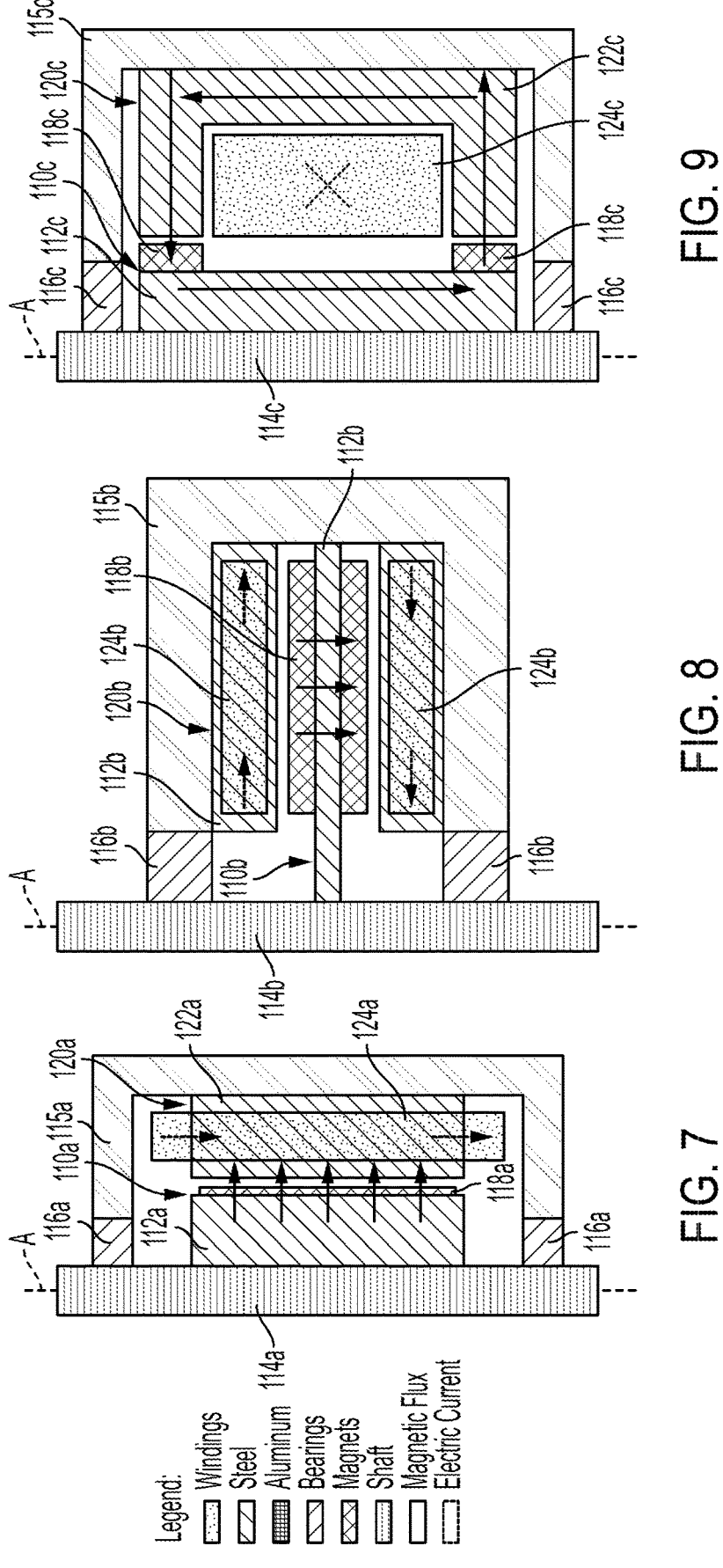
FIG. 7 shows a cross-sectional diagram of a radial flux machine (RFM) according to the principles of the present disclosure.
FIG. 8 shows a cross-sectional diagram of an axial flux machine (AFM) according to the principles of the present disclosure.
FIG. 9 shows a cross-sectional diagram of a transverse flux machine (TFM) according to the principles of the present disclosure.

FIG. 7 shows a cross-sectional diagram of a radial flux machine (RFM). FIG. 8 shows a cross-sectional diagram of an axial flux machine (AFM). FIG. 9 shows a cross-sectional diagram of a transverse flux machine (TFM). Each of the RFM, AFM, and TFM devices includes a shaft configured to rotate about an axis A. Classification between the RFM, AFM, and TFM configurations may be made based on direction of magnetic flux.

The RFM of FIG. 7 includes a first rotor assembly 110a having a first rotor core 112a attached to rotate with a first shaft 114a about an axis A. The first rotor assembly 110a is located within a first housing 115a and the first shaft 114a extends through and out of the first housing 115a and is supported by a pair of first bearings 116a. A set of first permanent magnets 118a is attached to the first rotor core 112a and produces a magnetic flux that extends radially outwardly. The RFM of FIG. 7 also includes a first stator assembly 120a having a first stator core 122a with a set of first windings 124a extending therethrough and carrying electric current in an axial direction, parallel to the axis A, and perpendicular to the magnetic flux.

The AFM of FIG. 8 includes a second rotor assembly 110b having a second rotor core 112b attached to rotate with a second shaft 114b about an axis A. The second rotor assembly 110b is located within a second housing 115b and the second shaft 114b extends through and out of the second housing 115b and is supported by a pair of second bearings 116b. A set of second permanent magnets 118b is attached to the second rotor core 112b and produces a magnetic flux that extends in an axial direction, parallel to the axis A. The AFM of FIG. 8 also includes a second stator assembly 120b having a second stator core 122b with a set of second windings 124b extending therethrough and carrying electric current in a radial direction, perpendicular to the axis A, and perpendicular to the magnetic flux.

The TFM of FIG. 9 includes a third rotor assembly 110c having a third rotor core 112c attached to rotate with a third shaft 114c about an axis A. The third rotor assembly 110c is located within a third housing 115c and the third shaft 114c extends through and out of the third housing 115c and is supported by a pair of third bearings 116c. A set of third permanent magnets 118c is attached to the third rotor core 112c and produces a magnetic flux that extends radially inwardly at a first location, axially through the third rotor core 112c, and radially outwardly at a second location spaced apart axially apart from the first location. The TFM of FIG. 9 also includes a third stator assembly 120c having a third stator core 122c with a set of third windings 124c extending therethrough and carrying electric current in an circumferential direction, perpendicular to the axis A, and perpendicular to the magnetic flux. As shown, the third stator core 122c defines a U-shape, with open ends aligned with the third permanent magnets 118c at the first and second locations for providing, with the third rotor core 112c, a closed rectangular path of the magnetic flux.

FIGS. 7-9 show the flux direction in the three machine topologies. For the RFM, the flux moves radially in the airgap, whereas for the AFM the flux moves axially from the stator to rotor and vice versa. However, as seen in FIG. 9, for the TFM, the flux moves both in the radial and the axial planes. Even though several topologies of TFM can be identified from the literature, 3D (radial and axial) flux paths are a common feature across different topologies. TFMs are known for their higher volumetric and gravimetric power densities compared to radial flux machines. AFMs and TFMs are known to have comparable power densities. However, the simplicity of the ring windings in a TFM has the potential to ease manufacturing process and save cost.

As shown in FIG. 7, the magnetic flux in the RFM extends primarily in a radial direction, perpendicularly to the axis A. As shown in FIG. 8, the magnetic flux in the AFM extends primarily in an axial direction, parallel to the axis A. As shown in FIG. 9 the magnetic flux in the TFM defines a closed loop path, with portions extending in a radial direction, perpendicularly to the axis A, and with other portions extending in an axial direction, parallel to the axis A. The RFM, AFM, and TFM configurations may each provide different volumetric and gravimetric power densities. The TFM configuration may be especially well suited for low speed and high torque operation.

The present disclosure provides a Transverse flux machine (TFM) topology for a direct drive SbW HWA architecture. Transverse flux machines have the potential to provide significant power density advantages over the traditional radial flux machines in the low-speed high torque region of operation of a direct drive SbW HWA. Traditional RFMs can be laminated in the radial X-Y plane to accommodate their 2D flux paths and reduce eddy current losses at high frequencies of operation. AFMs can be laminated as well in the axial X-Z plane to assist the axial travel of the flux from the stator to rotor and vice versa. However, as seen in FIG. 9, for a TFM the flux moves in both an axial direction and a radial direction between the third stator assembly 120c and the third rotor assembly 110c.

If a TFM were to include laminated cores, it would need to have both X-Y and X-Z direction laminations depending on the core location and intended direction of flux travel. This may severely complicate the manufacturing process of the TFM. In order to avoid complications and ensure 3D flux travel in the TFM cores, soft magnetic core (SMC) material may be used for either or both of the rotor core and/or the stator core. SMC material includes insulated iron particles compacted into the shape of the cores. Electrical insulation among the iron particles of a compacted SMC core significantly reduces the eddy current loss at higher frequencies of operation.

Several TFM topologies have been considered, with different performance areas where they excel. TFM designs generally indicate a trend towards increasing volumetric torque density. However, for a steering application, the actuator is subjected to much stricter constraints of torque ripple, cogging torque, friction loss and so on. Moreover, manufacturing ease is an important criterion.

Reducing the number of pieces in the TFM may simplify the manufacturing process. Moreover, flux concentrating rotor structures display higher power densities and reduced magnet weight compared to other rotor topologies. Furthermore, the ring winding structure of the TFMs simplifies the winding process compared to needle wound radial flux machines. The TFM design shown in FIG. 10 may be especially advantageous due to manufacturing considerations provided by the topology. Stator cores can be stacked axially and space shifted circumferentially to form a multiphase machine.

Figure 10:
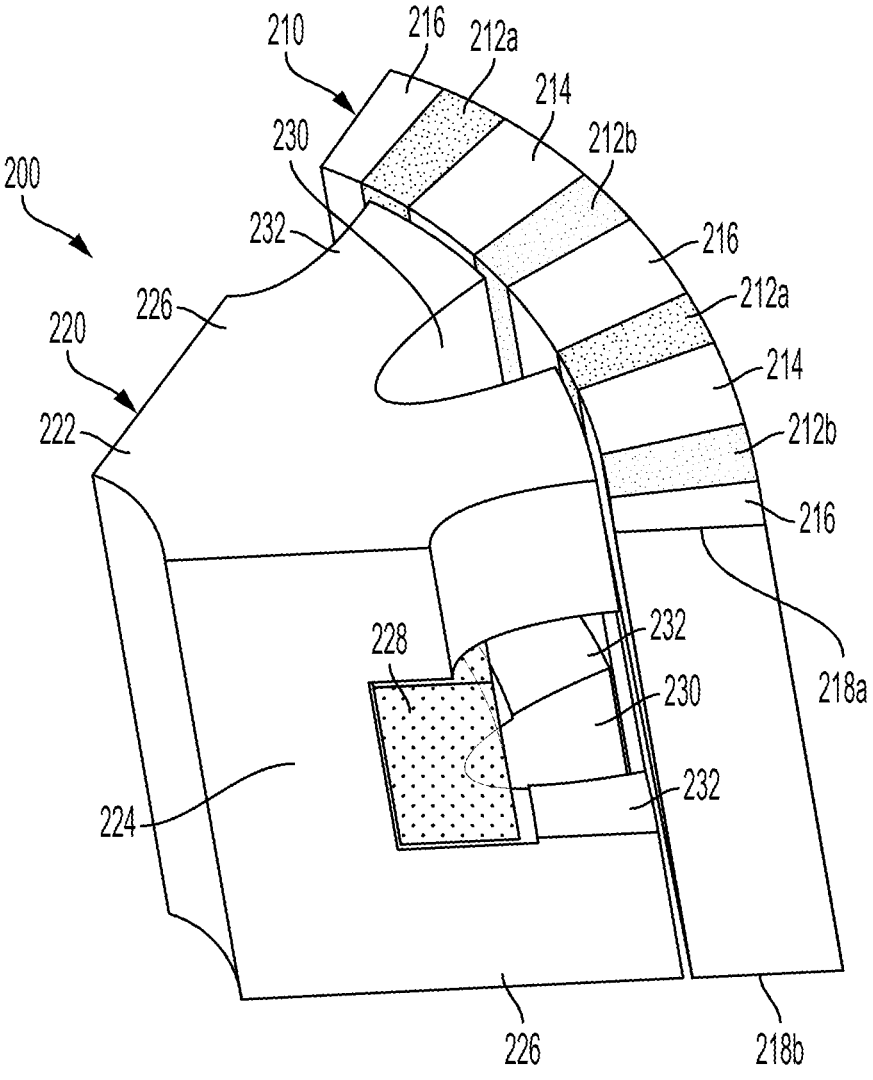
FIG. 10 shows a perspective fragmentary view of a TFM with a flux-concentrating external rotor and a single-piece stator, according to the principles of the present disclosure.
Figures 14A, 14B, 14C:
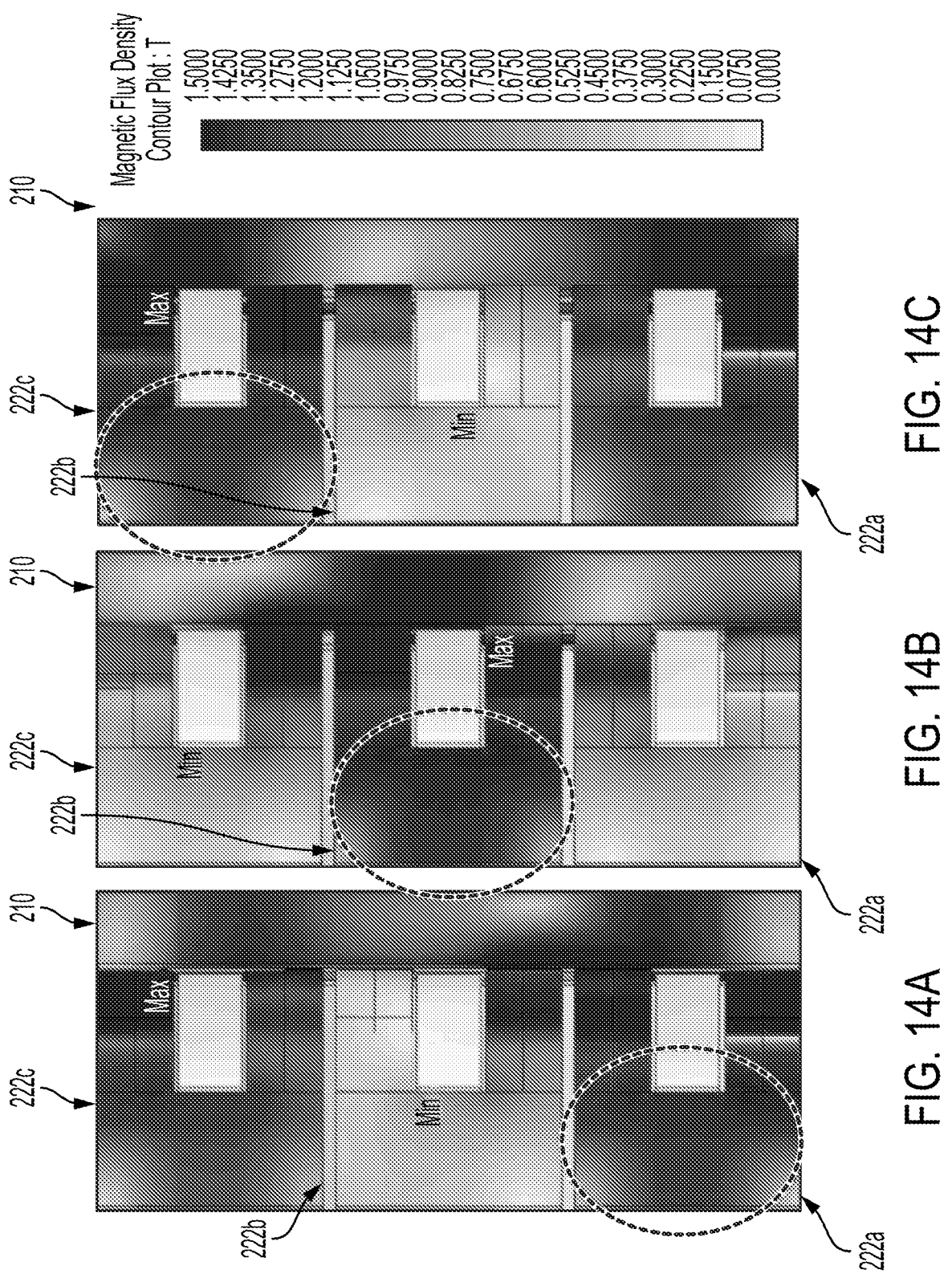
FIGS. 14A-14C show magnetic flux density during peak current for each of three phases of the three-phase TFM with flux linkage imbalance.

FIG. 10 presents a TFM 200 having an external rotor configuration, with a rotor assembly 210 that is configured to rotate about an axis, with the rotor extending annularly about a stator assembly 220. FIG. 14B shows a 45-degree segment of the TFM 200, with labels indicating magnetic flux. However, the complete TFM 200 would include eight of such segments. The rotor assembly 210 includes a plurality of pairs of permanent magnets 212a, 212b arranged at regular angular intervals and configured to produce magnetic flux in a circumferential direction therebetween.

The rotor assembly 210 also includes a plurality of flux concentrating cores 214 located between the permanent magnets 212a, 212b of each of the pairs of permanent magnets 212a, 212b and configured to conduct the magnetic flux therebetween. The rotor assembly 210 also includes a plurality of a flux diverging cores 216, each located between adjacent pairs of the permanent magnets 212a, 212b. The rotor assembly 210 has a tubular shape and extends between a first axial end 218a and a second axial end 218b. In some embodiments, either or both of the flux concentrating cores 214 and/or the flux diverging cores 216 may be made of a soft magnetic core (SMC) material. However, other types of materials may be used for either or both of the flux concentrating cores 214 and/or the flux diverging cores 216.

As also shown in FIG. 10, the stator assembly 220 includes a stator core 222 having a U-shaped cross-section with an inner cylindrical portion 224 and a pair of arms 226 extending radially outwardly from each end of the inner cylindrical portion 224 and toward the rotor assembly 210. A winding 228 extends in circumferential direction through the center of the U-shaped cross-section of the stator core 222 and conducts electrical current in the circumferential direction.

As shown, each arm 226 of the stator core 222 includes an arc-shaped recess 230 to define two radial-extending protrusions 232 that are angularly spaced apart to align with adjacent ones of the flux concentrating cores 214. In this way, magnetic flux is conducted from each of the flux concentrating cores 214 adjacent the first axial end 218, across an air gap and into the radial-extending protrusions 232 of the stator core 222 adjacent thereto. The magnetic flux is directed into the inner cylindrical portion 224 of the stator core 222 where it continues in an axial direction. The magnetic flux is also directed out of the inner cylindrical portion 224 of the stator core 222 and radially outwardly through the arms 226 of the stator core 222 adjacent to the second axial end 218b, where it crosses the air gap and back into the flux concentrating cores 214, completing a closed path.

A TFM may be particularly well suited for direct drive low speed operation. The TFM may include a modular, spatially shifted three-phase stator architecture. The TFM may include a simple ring winding with inner stator topology. The TFM may provide a relatively low phase resistance, independent of number of stator slots and rotor poles. The TFM may include an external rotor structure with high volumetric and gravimetric torque density. The TFM may be relatively easily and efficiently manufactured and may provide suitable performance for a variety of applications in an EPS and/or SbW system.

Pole Number

The phase resistance and the coil cross-section in a ring wound TFM are independent of the number of poles which enables higher torque density in TFMs compared to RFMs. Moreover, for the intended SbW direct drive HWA application the operating speed is low. This indicates that the fundamental electrical frequency of operation will be within regular EPS margins even if a higher pole number TFM is chosen. For example, for a 12 slot 8 pole SbW HWA with a gear ratio of 11:1, the fundamental frequency is 166.67 Hz at 2500 motor rpm. On the other hand, for a TFM with 100 poles and a direct drive structure, the fundamental frequency is 189.39 Hz at 227.27 motor rpm. The limiting number of poles ($P_{max}$) for a TFM can be calculated using equation (1):

$$n_{limit} = \frac{120 f_{e,max}}{P_{max}} \tag{1}$$

where $n_{limit}$ is the maximum motor speed in rpm, $f_{e,max}$ is the maximum fundamental electrical frequency that can be handled by the motor drive.

Moreover, despite higher number of poles in TFMs the phase resistance does not increase which can offer reduced copper loss and thus improve efficiency and thermal performance.

Internal Rotor/External Rotor Topology

The general sizing equation of a TFM can be written as in equation (2):

$$P_R = \frac{m}{2}\frac{1}{1+K_{phi}}K_eK_iK_pK_L\eta B_gA\frac{f}{p}\lambda_o^2D_o^2L_e \qquad (2)$$

where $P_R$ is the rated output power, $K_{phi}$ is the ratio of electrical loading on rotor and stator ($K_{phi}$ may be equal to zero), m is the number of phases, $K_e$ is the BEMF factor incorporating the winding distribution factor Kw and the per unit portion of the total air gap area spanned by the salient poles of the machine (if any), $K_i$ is the current waveform factor, $K_p$ is the electrical power waveform factor, $K_L$ is the ratio of the stack length $L_e$ vs. the diameter of the airgap surface $D_g$, n is the machine efficiency, $B_g$ is the airgap flux density, A is the total electrical loading, f is the driver frequency, p is the number of pole pairs, $D_o$ is the outer diameter of the machine and $\lambda_o$ is the ratio between $D_g$ and $D_o$.

As evident from equation (2), the rated power and thus the torque output of the TFM is directly proportional to the square of the outer diameter of the machine $D_o$. Substituting $D_g/D_o$ in place of $\lambda_o$ it can be shown from (2) that the output power directly relates to the square of $D_g$. Going from an internal rotor TFM to an external rotor TFM, the diameter of the airgap surface can be increased with better space utilization. This leads to higher volumetric torque density in external rotor TFMs. Moreover, in external rotor TFMs the winding process is comparatively simpler. Both outer and internal rotor TFMs are systematically optimized in accordance with the present disclosure.

Figure 11:
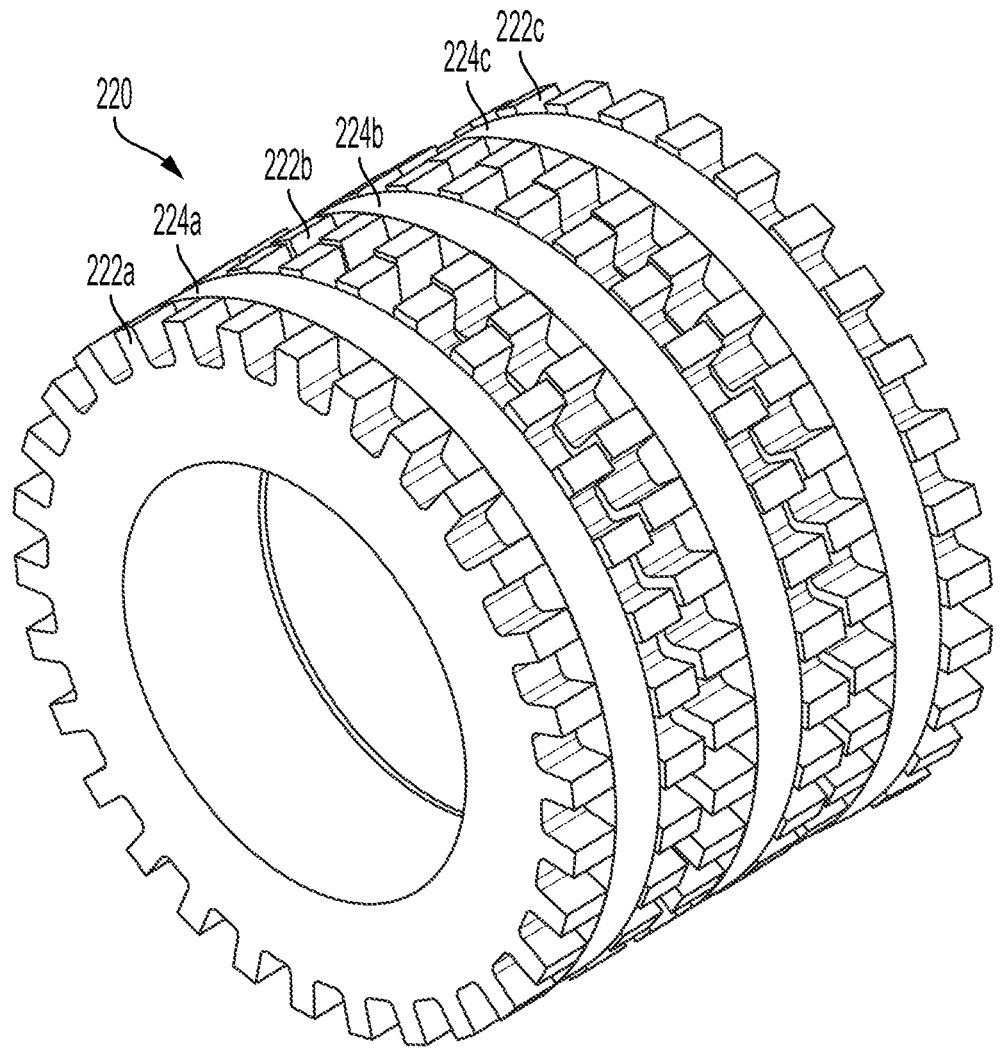
FIG. 11 shows a perspective view of a stator in an external rotor TFM according to the principles of the present disclosure.

FIG. 11 shows a perspective view of the stator assembly 220 for an external rotor TFM, which is configured to have the rotor (not shown) disposed annularly thereabout. The stator assembly 220 includes three stator cores 222a, 222b, 222c, including an A-phase stator core 222a, a B-phase stator core 222b, and a C-phase stator core 222c. The three stator cores 222a, 222b, 222c each have similar or identical ring shapes that are stacked axially and shifted circumferentially from one-another. Each of the three stator cores 222a, 222b, 222c of the stator assembly 220 contains a corresponding winding 224a, 224b, 224c of a corresponding phase, and which extends circumferentially therethrough. Each of the three stator cores 222a, 222b, 222c of the stator assembly 220 also defines a plurality of radial-extending protrusions at regular angular intervals and extending radially outwardly.

The stacked assembly of the TFM stator leads to inherent asymmetry issues. As shown in FIG. 11, the B-phase stator core 222b is stacked between the A-phase stator core 222a and the C-phase stator core 222c in a 3-phase TFM. The A-phase stator core 222a and the C-phase stator core 222c may each be called exterior cores because of their location adjacent to an axial end of the stator assembly. The B-phase stator core 222b may be called an interior stator core, because of its location spaced apart from the axial end of the stator assembly.

Figure 12:
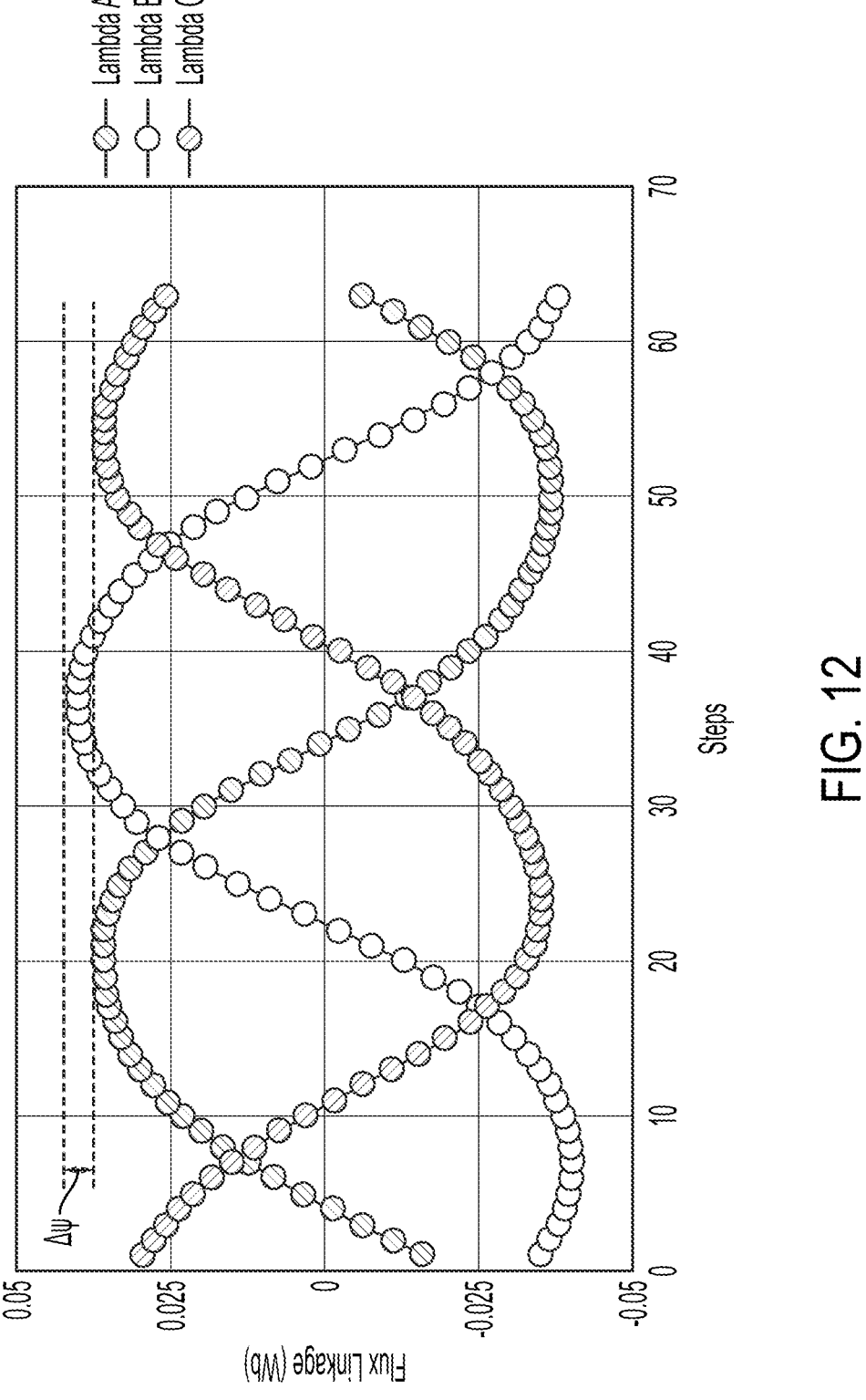
FIG. 12 shows a graph illustrating flux linkage imbalance between phases of a three-phase TFM.

FIG. 12 shows a graph illustrating flux linkage imbalance between the rotor assembly 210 and three stator cores 222a, 222b, 222c of the stator assembly 220 in a three-phase TFM, where each of the three stator cores 222a, 222b, 222c have a similar or identical construction. FIG. 12 illustrates a difference in peak flux linkage $\Delta\Psi$ between the phases A, B, C, of the three stator cores 222a, 222b, 222c, respectively.

As shown, the peak flux linkage of phase B is higher than those of phase A and C, with a peak value that is about 0.005 Weber (Wb) higher than the peak flux linkage of the A and C phases. This asymmetry in flux linkage can produce a second-order torque ripple during operation of the TFM. This difference in peak flux linkage may be a result of the B-phase stator core 222b being sandwiched between the A-phase stator core 222a and the C-phase stator core 222c, and not exposed to air as much as the A-phase stator core 222a and the C-phase stator core 222c. Flux leakages from the A-phase stator core 222a and the C-phase stator core 222c may also contribute to increase the flux linkage in the B-phase stator core 222b.

Figure 13:
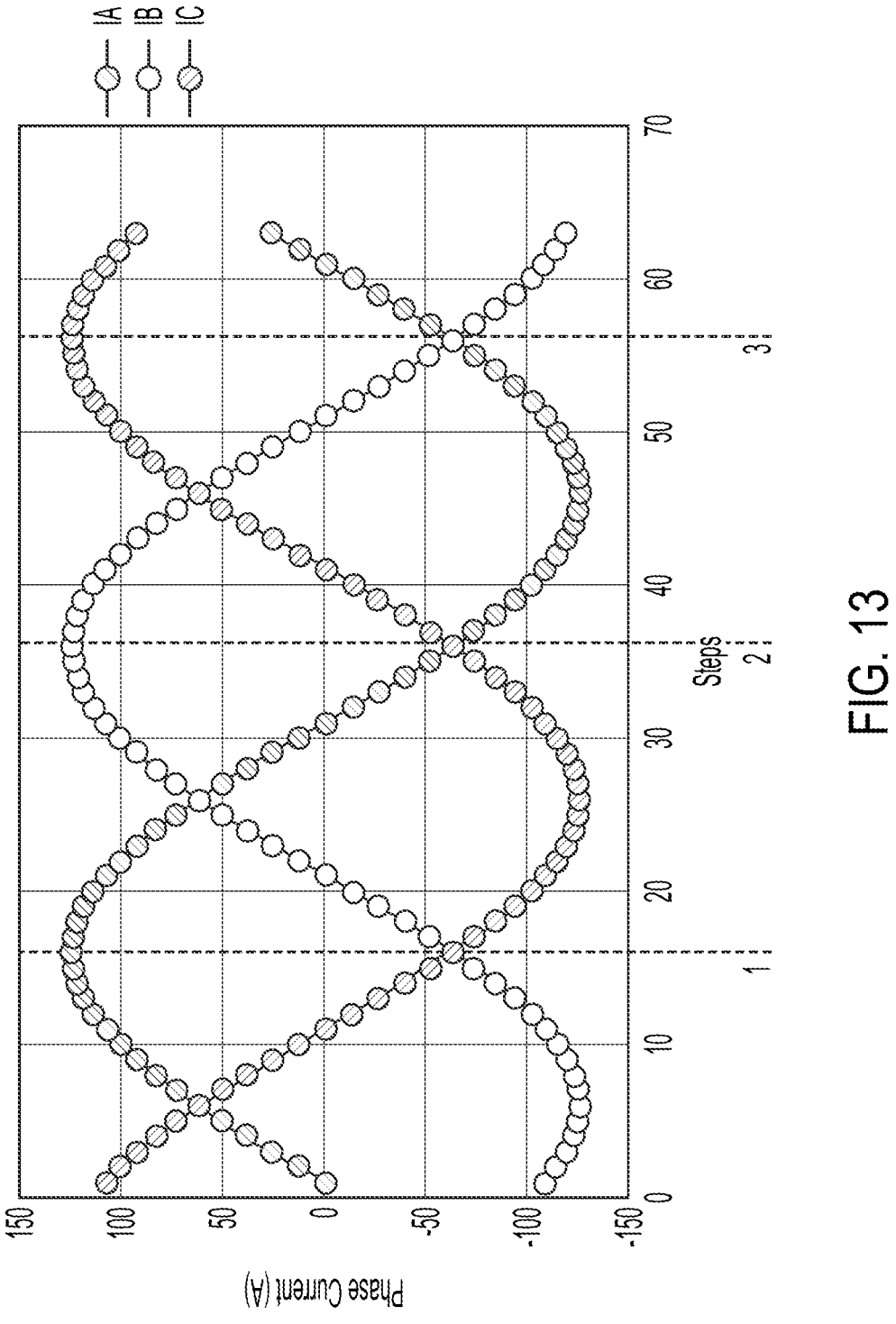
FIG. 13 shows a graph illustrating phase currents in a three-phase TFM.

FIG. 13 shows a graph illustrating phase currents in a three-phase TFM, including a time step (1) of a peak A-phase current, a time step (2) of a peak B-phase current, and a time step (3) of a of a peak C-phase current FIGS. 14A-14C show magnetic flux density in the three-phase TFM with windings having equal numbers of turns on all phases (NA=NB=NC, NA, NB and NC are number of turns of Phase A, B and C respectively) and during times (1), (2), and (3), respectively. Asymmetric flux linkage leads to asymmetric saturation in the TFM stator core. As shown in FIG. 14B, the B-phase stator core 222b saturates more (higher flux density at instant 2) compared to the other two stator cores 222a, 222c. This asymmetric saturation gives rise to torque ripple.

The present disclosure provides a solution to mitigate the flux linkage asymmetry in such a three-phase TFM by using rotor segments configured to provide different flux linkages. More specifically, the TFM of the present disclosure uses rotor segments having different axial lengths and/or different remnant flux densities. A 60 pole TFM with 16 winding turns is provided to demonstrate the principles of the present disclosure.

Figures 15A, 15B:
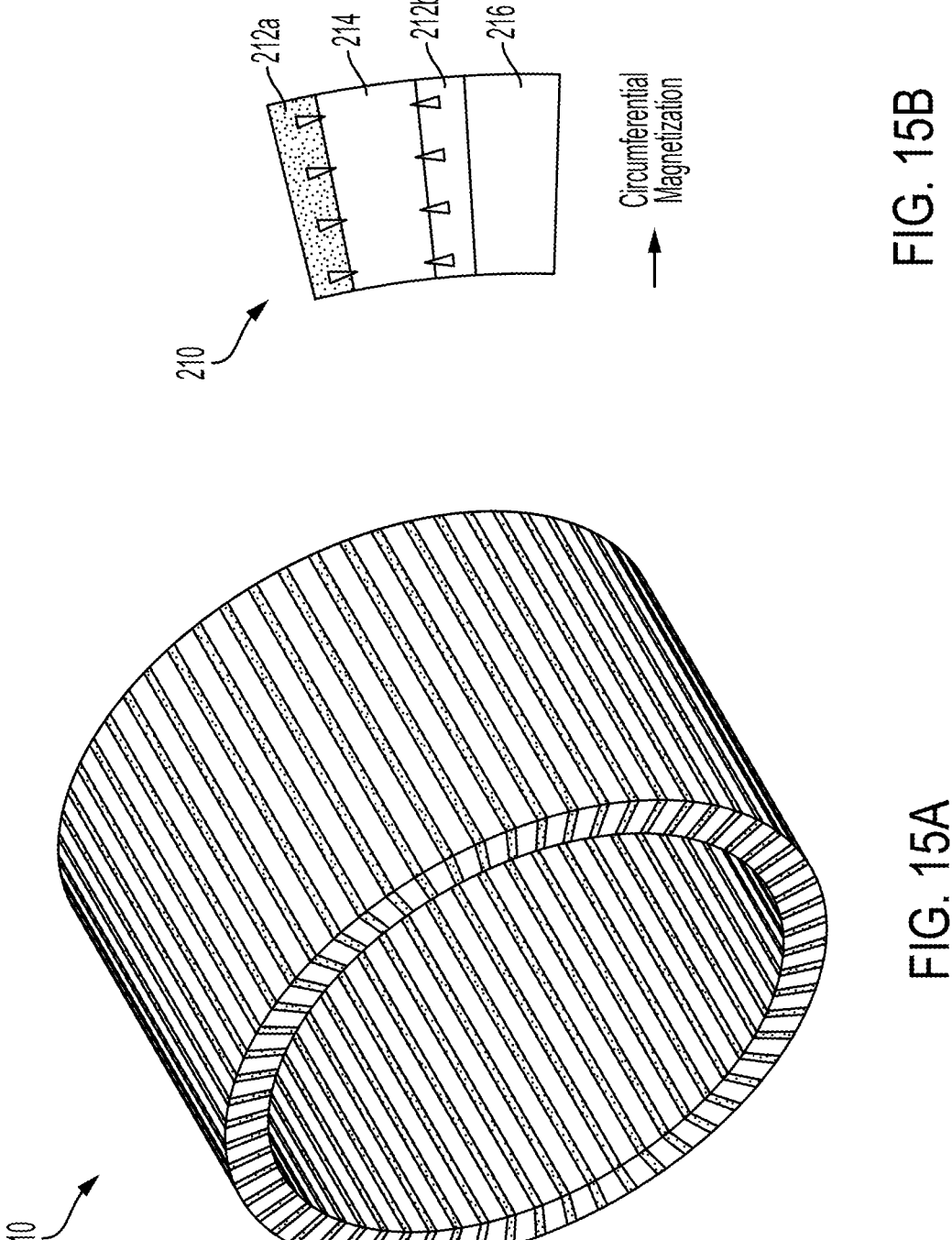
FIG. 15A shows a perspective view of a rotor assembly of the TFM according to the principles of the present disclosure.
FIG. 15B shows an enlarged cross-sectional fragmentary view of the rotor assembly of FIG. 15A.

FIG. 15A shows a perspective view of a rotor assembly 210 of the TFM 200. This rotor assembly 210 may be called a flux-concentrating external rotor design. FIG. 15B shows an enlarged cross-sectional fragmentary view of the rotor assembly 210. Arrows indicate magnetic field lines associated with the permanent magnets 212a, 212b and extending in a circumferential direction into the flux concentrating cores 214. As shown, the rotor assembly 210 includes several solid rotor sections 240 that are each similar or identical, with each of the solid rotor sections 240 having an elongated shape and each including one of the flux concentrating cores 214, located between two permanent magnets 212a, 212b, and one of the flux diverging cores 216 located outside of the two permanent magnets 212a, 212b for spacing the permanent magnets 212a, 212b apart from the permanent magnets 212a, 212b of a next-adjacent one of the solid rotor sections 240.

FIG. 16 shows a perspective view of a solid rotor section 240 of the rotor assembly 210, illustrating the elongate shape. The elongate shapes of the permanent magnets 212a, 212b, the flux concentrating cores 214, and the flux diverging cores 216 make each of those components, and the combined solid rotor sections 240 fragile and susceptible to breakage before and during assembly.

FIG. 17 shows a perspective view of a segmented rotor section 340, in accordance with the present disclosure. The segmented rotor sections 340 may be used in place of the solid rotor sections 240 to construct the rotor assembly 210. As shown, the segmented rotor section 340 includes a stack of three of the rotor segments 342a, 342b, 342c, with glue joints 344 connecting adjacent ones of the rotor segments 342a, 342b, 342c. However, the segmented rotor section 340 may include a different number of the rotor segments 342*a*, 342*b*, 342*c*. Each of the rotor segments 342*a*, 342*b*, 342*c* includes two magnet segments 312*a*, 312*b*, a flux concentrating core segment 314 located therebetween, and a flux diverging core segment 316. Stacked together, the magnet segments 312*a*, 312*b* of the three rotor segments 342*a*, 342*b*, 342*c* each approximate in size and function, a corresponding one of the permanent magnets 212*a*, 212*b* of the solid rotor sections 240. Similarly, the flux concentrating core segments 314 of the three rotor segments 342*a*, 342*b*, 342*c*, when stacked together, approximate in size and function, a corresponding flux concentrating core 214 of the solid rotor sections 240. Similarly, the flux diverging core segments 316 of the three rotor segments 342*a*, 342*b*, 342*c*, when stacked together, approximate in size and function, a corresponding flux diverging core 216 of the solid rotor sections 240.

In some embodiments, either or both of the flux concentrating core segments 314 and/or the flux diverging core segments 316 may be made of a soft magnetic core (SMC) material. However, other types of materials may be used for either or both of the flux concentrating core segments 314 and/or the flux diverging core segments 316.

In some embodiments, and as shown in the FIGS., the segmented rotor section 340 includes a same number of the rotor segments 342*a*, 342*b*, 342*c* as the stator cores 222*a*, 222*b*, 222*c* in the stator assembly 220. In some embodiments, the three stator cores 222*a*, 222*b*, 222*c* of the stator assembly 220 may each be axially aligned with a corresponding one of the rotor segments 342*a*, 342*b*, 342*c* of the rotor assembly. The illustrated embodiments show the TFM 200 as a three-phase machine having three of the stator cores 222*a*, 222*b*, 222*c* and three of the rotor segments 342*a*, 342*b*, 342*c*. However, the principles of the present disclosure may be applied to electric machines with a different number of phases and/or a different number of stator of the stator cores 222*a*, 222*b*, 222*c* and/or a different number of the rotor segments 342*a*, 342*b*, 342*c*.

Figure 18:
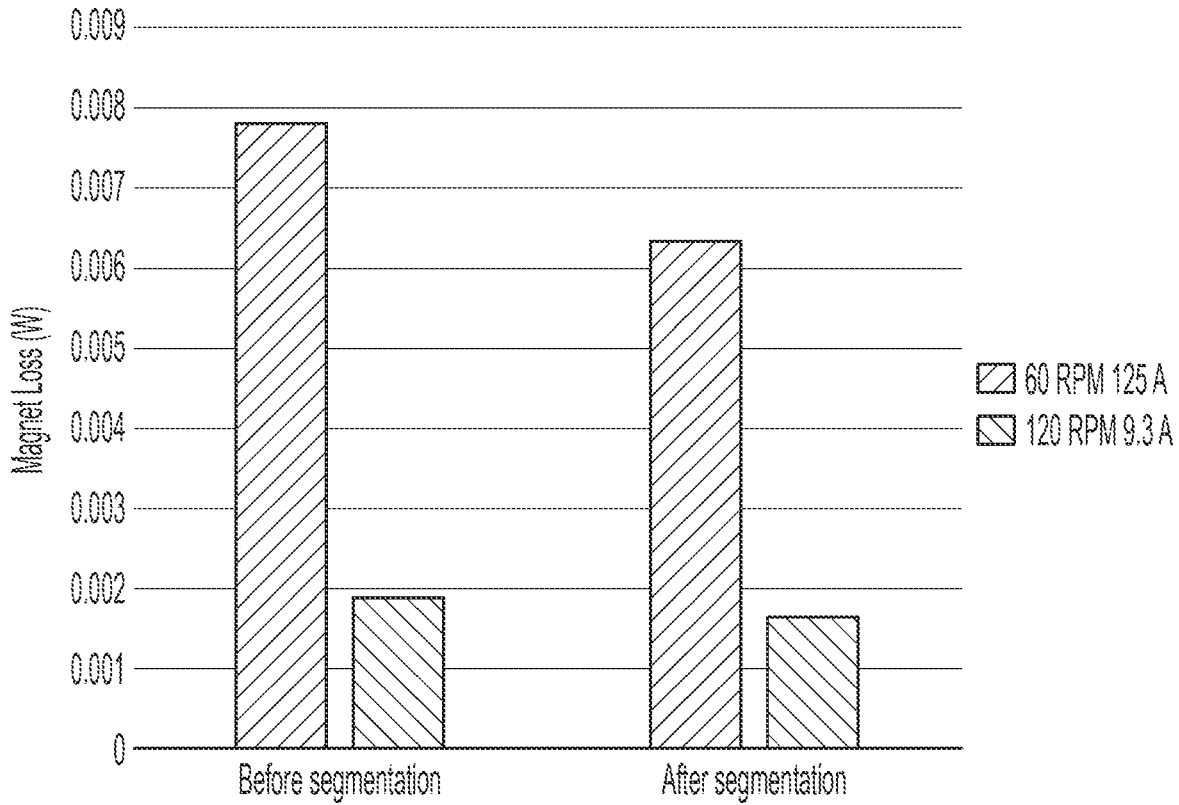
FIG. 18 shows a graph illustrating Magnet Losses in Watts (W) for a three-phase TFM with a rotor assembly having solid rotor sections and with segmented sections, during operation at 60 RPM and 125 A, and at 120 RPM and 9.3 A.

FIG. 18 shows a graph illustrating Magnet Losses in Watts (W) for a three-phase TFM with a rotor assembly having solid rotor sections 240, and with the segmented rotor sections 340, during operation at 60 RPM and 125 A, and at 120 RPM and 9.3 A.

Figures 19A, 19B, 19C:
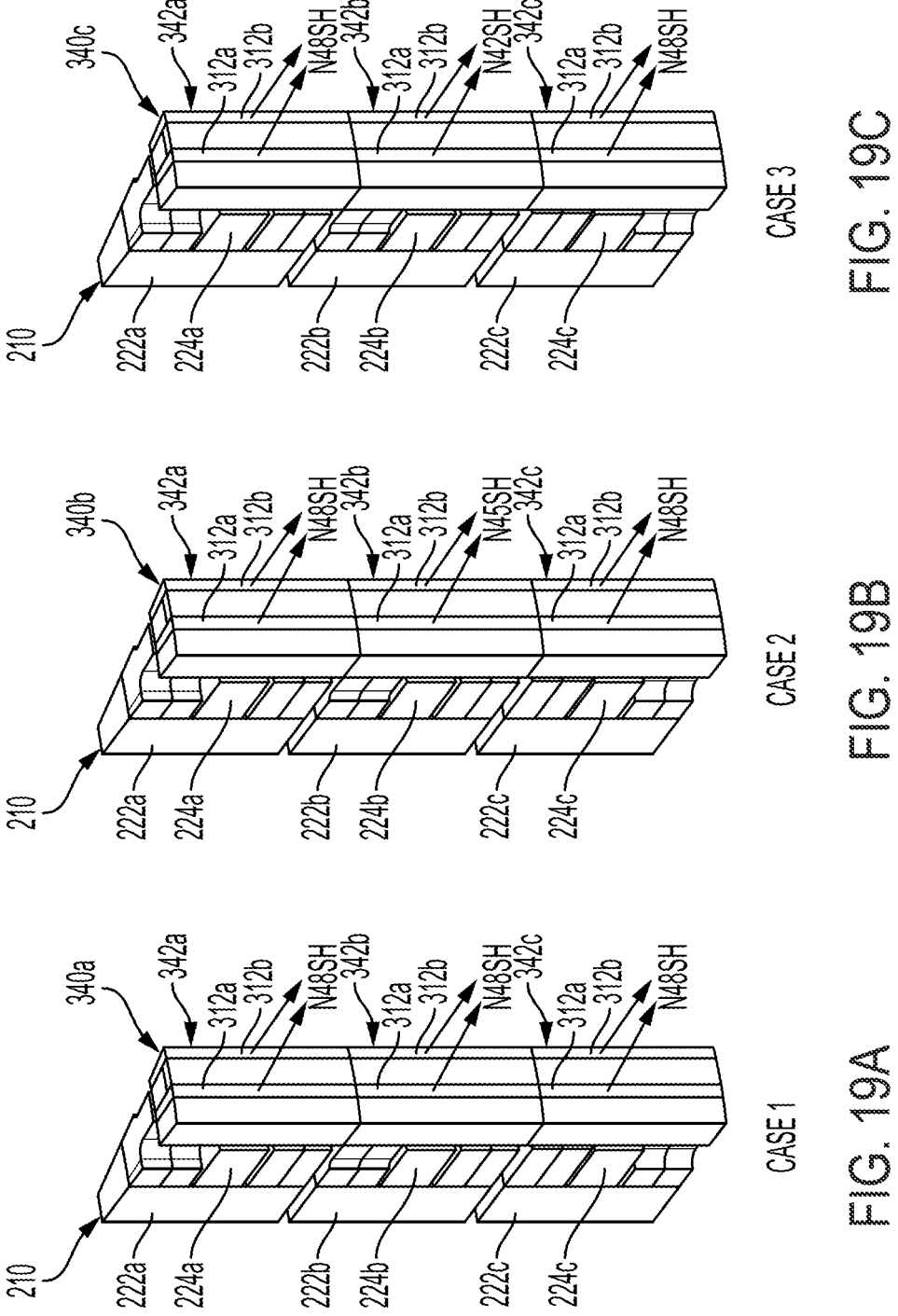
FIGS. 19A-19C each show a perspective view of a section of a rotor assembly, with various different arrangements of permanent magnets.

FIGS. 19A-19C each show a perspective view of a section of a rotor assembly 210, with various different arrangements of permanent magnets. FIG. 19A shows a first type 340*a* of the segmented rotor sections 340 with each of the rotor segments 342*a*, 342*b*, 342*c* having magnet segments 312*a*, 312*b* with N48SH type magnets, each having an identical strength or remnant flux density.

FIG. 19B shows a second type 340*b* of the segmented rotor sections 340. The second type 340*b* of the segmented rotor sections 340 includes exterior segments 342*a*, 342*c*, which are located adjacent to axial ends of the rotor assembly 210, having the N48SH type magnets. FIG. 19B also shows the segmented rotor sections 340 including an interior segment 342*b*, which is spaced apart from the axial end of the rotor assembly 210, and which has N45SH type magnets for its magnet segments 312*a*, 312*b*. The N45SH type magnets of the interior segment 342*b* have a lower remnant flux density than the N48SH type magnets of the exterior segments 342*a*, and 342*c*.

FIG. 19C a third type 340*c* of the segmented rotor sections 340, which is similar to the arrangement of the second type 340*b* shown in FIG. 19B, with the same N48SH type magnets in the exterior segments 342*a*, 342*c*. but with the interior segment 342*b* including N42SH type magnets, which have a further lower remnant flux density than the N45SH type magnets used in the interior segment 342*b* of the second type 340*b* of the segmented rotor sections 340.

The lower-strength permanent magnets 312*a*, 312*b* in the interior segments 342*b* to offset or compensate for the increased flux linkage that would otherwise be present on the phase or phases associated with the interior segment. The lower-strength permanent magnets of the magnet segments 312*a*, 312*b* in the interior segments 342*b* may, thereby, mitigate the inherent asymmetry issues present in TFMs.

In some embodiments, not shown in the drawings, two of the rotor segments 342*a*, 342*b*, 342*c* may have different lengths in an axial direction. For example, an interior segment 342*b*, which is spaced apart from the axial end of the rotor assembly 210, may have a shorter axial length than the exterior segments 342*a*, 342*c*, which are located adjacent to axial ends of the rotor assembly 210. This arrangement with the rotor segments 342*a*, 342*b*, 342*c* having different axial lengths may be used instead of, or in addition to an arrangement with the rotor segments 342*a*, 342*b*, 342*c* having different remnant flux densities.

Figure 20:
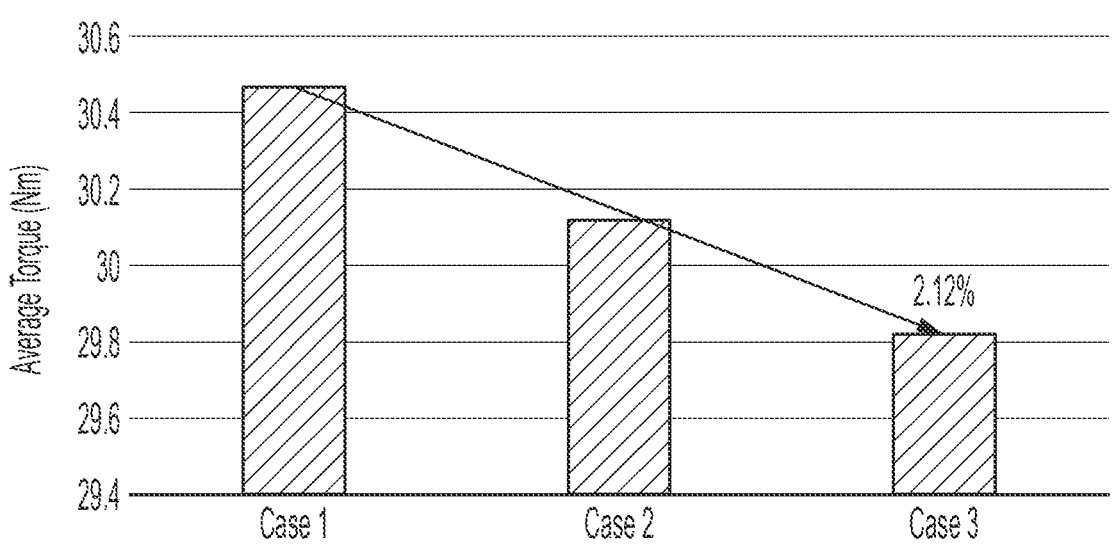
FIG. 20 shows a graph illustrating Average Torque in Newton meters (Nm) for a three-phase TFM with exterior segments of the rotor assembly each having equal strength permanent magnets, and with an interior segment having various different strengths of permanent magnets.
Figure 21:
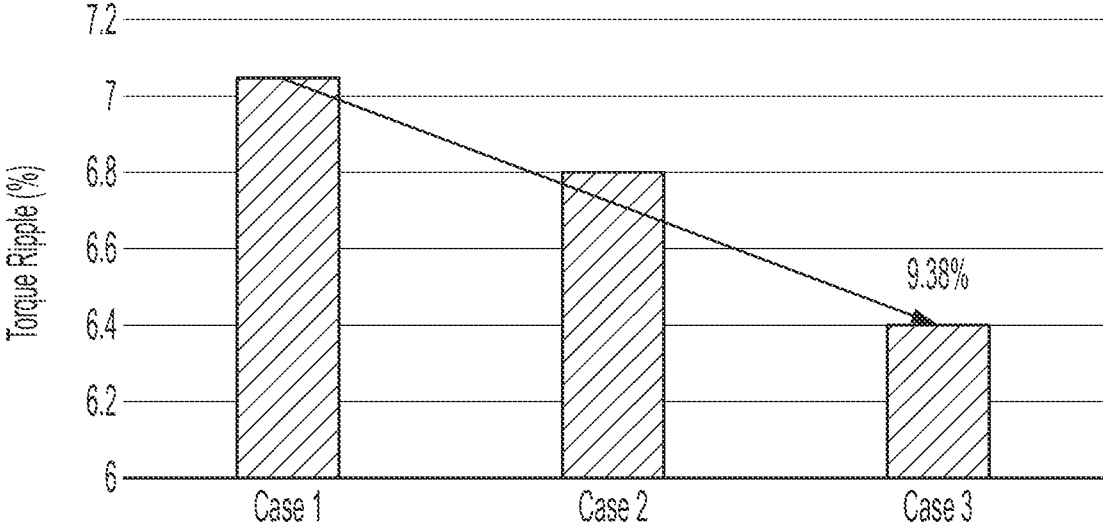
FIG. 21 shows a graph illustrating Torque Ripple (%) for a three-phase TFM with exterior segments of the rotor assembly each having equal strength permanent magnets, and with an interior segment having various different strengths of permanent magnets.

FIGS. 20-21 show graphs illustrating performance of TFMs incorporating the three different types 340*a*, 340*b*, 340*c* of the segmented rotor sections 340, which are labeled as Case 1, Case 2, and Case 3, respectively. FIG. 20 shows a graph illustrating Average Torque in Newton meters (Nm) for a three-phase TFM with exterior segments of the rotor assembly each having equal strength permanent magnets, and with an interior segment 342*b* having various different strengths of permanent magnets. FIG. 21 shows a graph illustrating Torque Ripple (%) for a three-phase TFM with exterior segments of the rotor assembly 210 each having equal strength permanent magnets, and with an interior segment 342*b* having various different strengths of permanent magnets.

As shown, decreasing the residual flux density on the interior segment 342*b* of the rotor assembly 210 corresponds to a reduction in the average torque produced. However, there is also aa significant reduction in torque ripple. For example, with N42SH grade magnets (case 3) on the interior segment 342*b*, the average torque decreases by a 2.12% only compared to case 1. However, case 3 has a 9.38% lower torque ripple compared to case 1.

The present disclosure provides a transverse flux machine (TFM). The TFM comprises: a rotor assembly configured to rotate about an axis and including a plurality of segments stacked axially, each segment of the plurality of segments including a rotor core and a plurality of permanent magnets; and a stator assembly including a transverse flux core configured to direct a magnetic flux in each of an axial direction and a radial direction toward the rotor assembly.

In some embodiments, the TFM has an internal rotor configuration, with the stator assembly extending annularly about the rotor assembly.

In some embodiments, the TFM has an external rotor configuration, with the rotor assembly extending annularly about the stator assembly.

In some embodiments, the TFM is a multi-phase machine having a plurality of stator windings, and wherein the transverse flux core of the stator assembly includes a plurality of stator cores, with each of the stator cores defining a ring shape and holding a corresponding stator winding of the plurality of stator windings, and wherein the stator cores are each axially aligned with a corresponding segment of the plurality of segments.

In some embodiments, the rotor assembly further includes two adjacent segments of the plurality of segments attached to one-another by a glue joint.

In some embodiments, the plurality of pairs of permanent magnets include a first set of permanent magnets having a first remnant flux density and a second set of permanent magnets having a second remnant flux density that is lower than the first remnant flux density.

In some embodiments, the first set of permanent magnets having the first remnant flux density are disposed within an exterior segment of the plurality of segments located adjacent to an axial end of the rotor assembly, and wherein the second set of permanent magnets having the second remnant flux density are disposed within an interior segment of the plurality of segments which is spaced apart from the axial end of the rotor assembly.

In some embodiments, at least one rotor core of the plurality of rotor cores includes a soft magnetic core (SMC) material.

In some embodiments, the TFM is a multi-phase machine having at least three stator windings, and wherein the transverse flux core of the stator assembly includes a plurality of stator cores, with each of the stator cores defining a ring shape and holding a corresponding stator winding of the at least three stator windings. In some embodiments, the stator cores are each axially aligned with a corresponding segment of the plurality of segments of the rotor assembly, the plurality of segments of the rotor assembly includes two exterior segments, each of the exterior segments defining an axial end of the rotor assembly and including a first set of permanent magnets having a first remnant flux density, and the plurality of segments of the rotor assembly includes at least one interior segment spaced apart from the axial ends of the rotor assembly and including a second set of permanent magnets having a second remnant flux density that is lower than the first remnant flux density.

The present disclosure also provides a steer-by-wire system for a vehicle. The steer-by-wire system comprises: a handwheel actuator coupled to apply a torque to a steering wheel. The handwheel actuator includes a transverse flux machine (TFM). The TFM includes: a rotor assembly configured to rotate about an axis and including a plurality of segments stacked axially, each segment of the plurality of segments including a rotor core and a plurality of permanent magnets; and a stator assembly including a transverse flux core configured to direct a magnetic flux in each of an axial direction and a radial direction toward the rotor assembly.

In some embodiments, the handwheel actuator is coupled to the steering wheel via a direct drive mechanism.

In some embodiments, the TFM has an internal rotor configuration, with the stator assembly extending annularly about the rotor assembly.

In some embodiments, the TFM has an external rotor configuration, with the rotor assembly extending annularly about the stator assembly.

In some embodiments, the TFM is a multi-phase machine having a plurality of stator windings, and the transverse flux core of the stator assembly includes a plurality of stator cores, with each of the stator cores defining a ring shape and holding a corresponding stator winding of the plurality of stator windings, and wherein the stator cores are each axially aligned with a corresponding segment of the plurality of segments.

In some embodiments, the rotor assembly further includes two adjacent segments of the plurality of segments attached to one-another by a glue joint.

In some embodiments, the plurality of pairs of permanent magnets include a first set of permanent magnets having a first remnant flux density and a second set of permanent magnets having a second remnant flux density that is lower than the first remnant flux density.

In some embodiments, the first set of permanent magnets having the first remnant flux density are disposed within an exterior segment of the plurality of segments located adjacent to an axial end of the rotor assembly, and wherein the second set of permanent magnets having the second remnant flux density are disposed within an interior segment of the plurality of segments which is spaced apart from the axial end of the rotor assembly.

In some embodiments, two segments of the plurality of segments have different lengths in an axial direction.

In some embodiments, at least one rotor core of the plurality of rotor cores includes a soft magnetic core (SMC).

In some embodiments, the TFM is a multi-phase machine having at least three stator windings, and wherein the transverse flux core of the stator assembly includes a plurality of stator cores, with each of the stator cores defining a ring shape and holding a corresponding stator winding of the at least three stator windings, the stator cores are each axially aligned with a corresponding segment of the plurality of segments of the rotor assembly, the plurality of segments of the rotor assembly includes two exterior segments, each of the exterior segments defining an axial end of the rotor assembly and including a first set of permanent magnets having a first remnant flux density, and the plurality of segments of the rotor assembly includes at least one interior segment spaced apart from the axial ends of the rotor assembly and including a second set of permanent magnets having a second remnant flux density that is lower than the first remnant flux density.

The above discussion is meant to be illustrative of the principles and various embodiments of the present disclosure. Numerous variations and modifications will become apparent to those skilled in the art once the above disclosure is fully appreciated. It is intended that the following claims be interpreted to embrace all such variations and modifications.

The word "example" is used herein to mean serving as an example, instance, or illustration. Any aspect or design described herein as "example" is not necessarily to be construed as preferred or advantageous over other aspects or designs. Rather, use of the word "example" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such.

Implementations the systems, algorithms, methods, instructions, etc., described herein can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors, or any other suitable circuit. In the claims, the term "processor" should be understood as encompassing any of the foregoing hardware, either singly or in combination. The terms "signal" and "data" are used interchangeably.

As used herein, the term module can include a packaged functional hardware unit designed for use with other components, a set of instructions executable by a controller (e.g., a processor executing software or firmware), processing circuitry configured to perform a particular function, and a self-contained hardware or software component that interfaces with a larger system. For example, a module can include an application specific integrated circuit (ASIC), a Field Programmable Gate Array (FPGA), a circuit, digital logic circuit, an analog circuit, a combination of discrete circuits, gates, and other types of hardware or combination thereof. In other embodiments, a module can include memory that stores instructions executable by a controller to implement a feature of the module.

Further, in one aspect, for example, systems described herein can be implemented using a general-purpose computer or general-purpose processor with a computer program that, when executed, carries out any of the respective methods, algorithms, and/or instructions described herein. In addition, or alternatively, for example, a special purpose computer/processor can be utilized which can contain other hardware for carrying out any of the methods, algorithms, or instructions described herein.

Further, all or a portion of implementations of the present disclosure can take the form of a computer program product accessible from, for example, a computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described embodiments, implementations, and aspects have been described in order to allow easy understanding of the present disclosure and do not limit the present disclosure. On the contrary, the disclosure is intended to cover various modifications and equivalent arrangements included within the scope of the appended claims, which scope is to be accorded the broadest interpretation so as to encompass all such modifications and equivalent structure as is permitted under the law.

What is claimed is:

1. A transverse flux machine (TFM) comprising:
a rotor assembly configured to rotate about an axis and including a plurality of segments stacked axially, each segment of the plurality of segments including a plurality of rotor cores and a plurality of permanent magnets; and
a stator assembly including a transverse flux core configured to direct a magnetic flux in each of an axial direction and a radial direction toward the rotor assembly,
wherein two segments of the plurality of segments have different lengths in an axial direction,
wherein the plurality of segments of the rotor assembly includes two exterior segments, each of the exterior segments defining an axial end of the rotor assembly,
wherein the plurality of segments of the rotor assembly includes at least one interior segment spaced apart from the axial ends of the rotor assembly, and wherein the at least one interior segment has a shorter axial length than each of the exterior segments.

2. The transverse flux machine of claim 1, wherein the TFM has an internal rotor configuration, with the stator assembly extending annularly about the rotor assembly.

3. The transverse flux machine of claim 1, wherein the TFM has an external rotor configuration, with the rotor assembly extending annularly about the stator assembly.

4. The transverse flux machine of claim 1, wherein the TFM is a multi-phase machine having a plurality of stator windings, and wherein the transverse flux core of the stator assembly includes a plurality of stator cores, with each of the stator cores defining a ring shape and holding a corresponding stator winding of the plurality of stator windings, and wherein the stator cores are each axially aligned with a corresponding segment of the plurality of segments.

5. The transverse flux machine of claim 1, wherein the rotor assembly further includes two adjacent segments of the plurality of segments attached to one-another by a glue joint.

6. The transverse flux machine of claim 1, wherein the plurality of permanent magnets include a first set of permanent magnets having a first remnant flux density, and a second set of permanent magnets having a second remnant flux density that is lower than the first remnant flux density.

7. The transverse flux machine of claim 6, wherein the first set of permanent magnets having the first remnant flux density are disposed within the exterior segment, and wherein the second set of permanent magnets having the second remnant flux density are disposed within the interior segment.

8. The transverse flux machine of claim 1, wherein at least one rotor core of the plurality of rotor cores includes a soft magnetic core (SMC) material.

9. The transverse flux machine of claim 1,
wherein the TFM is a multi-phase machine having at least three stator windings, and wherein the transverse flux core of the stator assembly includes a plurality of stator cores, with each of the stator cores defining a ring shape and holding a corresponding stator winding of the at least three stator windings,
wherein the stator cores are each axially aligned with a corresponding segment of the plurality of segments of the rotor assembly,
wherein each of the exterior segments includes a first set of permanent magnets having a first remnant flux density, and
wherein the at least one interior segment includes a second set of permanent magnets having a second remnant flux density that is lower than the first remnant flux density.

10. A steer-by-wire system for a vehicle, comprising:
a handwheel actuator coupled to apply a torque to a steering wheel;
the handwheel actuator including a transverse flux machine (TFM), including:
a rotor assembly configured to rotate about an axis and including a plurality of segments stacked axially, each segment of the plurality of segments including a plurality of rotor cores and a plurality of permanent magnets; and
a stator assembly including a transverse flux core configured to direct a magnetic flux in each of an axial direction and a radial direction toward the rotor assembly,
wherein the plurality of segments includes two exterior segments, each of the exterior segments located adjacent to a corresponding axial end of the rotor assembly, and wherein the plurality of segments includes an interior segment which is spaced apart from the axial ends of the rotor assembly, wherein the exterior segments each include a first set of permanent magnets having a first remnant flux density, and the interior segment includes a second set of permanent magnets, and wherein the interior segment has at least one of: a shorter axial length than the exterior segments, and/or the second set of permanent magnets having a second remnant flux density that is lower than the first remnant flux density of the first set of permanent magnets.

11. The steer-by-wire system of claim 10, wherein the handwheel actuator is coupled to the steering wheel via a direct drive mechanism.

12. The steer-by-wire system of claim 10, wherein the TFM has an internal rotor configuration, with the stator assembly extending annularly about the rotor assembly.

13. The steer-by-wire system of claim 10, wherein the TFM has an external rotor configuration, with the rotor assembly extending annularly about the stator assembly.

14. The steer-by-wire system of claim 10, wherein the TFM is a multi-phase machine having a plurality of stator windings, and wherein the transverse flux core of the stator assembly includes a plurality of stator cores, with each of the stator cores defining a ring shape and holding a corresponding stator winding of the plurality of stator windings, and wherein the stator cores are each axially aligned with a corresponding segment of the plurality of segments.

15. The steer-by-wire system of claim 10, wherein the rotor assembly further includes two adjacent segments of the plurality of segments attached to one-another by a glue joint.

16. The steer-by-wire system of claim 10, wherein the second remnant flux density of the second set of permanent magnets is lower than the first remnant flux density of the first set of permanent magnets.

17. The steer-by-wire system of claim 10, wherein at least one rotor core of the plurality of rotor cores includes a soft magnetic core (SMC) material.

18. The steer-by-wire system of claim 10, wherein the interior segment has a shorter axial length than the exterior segments.

19. A transverse flux machine (TFM) comprising:
a rotor assembly configured to rotate about an axis and including a plurality of segments stacked axially, each segment of the plurality of segments including a plurality of rotor cores and a plurality of permanent magnets; and
a stator assembly including a transverse flux core configured to direct a magnetic flux in each of an axial direction and a radial direction toward the rotor assembly,
wherein the plurality of permanent magnets include a first set of permanent magnets having a first remnant flux density, and a second set of permanent magnets having a second remnant flux density that is lower than the first remnant flux density, and
wherein the first set of permanent magnets having the first remnant flux density are disposed within an exterior segment of the plurality of segments located adjacent to an axial end of the rotor assembly, and wherein the second set of permanent magnets having the second remnant flux density are disposed within an interior segment of the plurality of segments which is spaced apart from the axial end of the rotor assembly.

20. The transverse flux machine of claim 19, wherein the TFM is a multi-phase machine having a plurality of stator windings, and wherein the transverse flux core of the stator assembly includes a plurality of stator cores, with each of the stator cores defining a ring shape and holding a corresponding stator winding of the plurality of stator windings, and wherein the stator cores are each axially aligned with a corresponding segment of the plurality of segments.

* * * * *